US010399281B2

(12) United States Patent
Mannella et al.

(10) Patent No.: US 10,399,281 B2
(45) Date of Patent: *Sep. 3, 2019

(54) ADDITIVE MANUFACTURING TECHNIQUE FOR PRINTING THREE-DIMENSIONAL PARTS WITH PRINTED RECEIVING SURFACES

(71) Applicant: Stratasys, Inc., Eden Prairie, MN (US)

(72) Inventors: Dominic F. Mannella, Minnetonka, MN (US); William J. Swanson, St. Paul, MN (US)

(73) Assignee: STRATASYS, INC., Eden Prairie, MN (US)

( * ) Notice: Subject to any disclaimer, the term of this patent is extended or adjusted under 35 U.S.C. 154(b) by 464 days.

This patent is subject to a terminal disclaimer.

(21) Appl. No.: 15/142,528

(22) Filed: Apr. 29, 2016

(65) Prior Publication Data

US 2016/0236421 A1 Aug. 18, 2016

Related U.S. Application Data

(63) Continuation of application No. 13/587,015, filed on Aug. 16, 2012, now Pat. No. 9,327,350.

(51) Int. Cl.
*B29C 69/00* (2006.01)
*B29C 67/00* (2017.01)
(Continued)

(52) U.S. Cl.
CPC ........ *B29C 67/0092* (2013.01); *B22F 3/1055* (2013.01); *B22F 5/10* (2013.01); *B29C 64/106* (2017.08); *B29C 64/40* (2017.08); *B33Y 10/00* (2014.12); *B33Y 30/00* (2014.12); *B22F 2003/1056* (2013.01);
(Continued)

(58) Field of Classification Search
CPC .............................. B29C 64/40; B29C 64/118
See application file for complete search history.

(56) References Cited

U.S. PATENT DOCUMENTS 4,567,489 A  1/1986 Obstfelder et al.
4,728,392 A  3/1988 Miura et al.
(Continued)

FOREIGN PATENT DOCUMENTS

DE  102010015451 A1 * 10/2011 .............. B22F 3/105
GB         816016         7/1959
(Continued)

OTHER PUBLICATIONS

Chinese Office Action dated Jan. 27, 2016 for corresponding Chinese Application No. 201380043584.4, filed Feb. 15, 2015.
(Continued)

*Primary Examiner* — Galen H Hauth
(74) *Attorney, Agent, or Firm* — Westman, Champlin & Koehler, P.A.

(57) ABSTRACT

A method for printing three-dimensional parts with an additive manufacturing system, comprising printing successive layers having increasing cross-sectional areas, and printing layers of a three-dimensional part onto the previously printed layers, where a last layer of the previously printed successive layers has a cross-sectional area that is at least as large as a footprint area of the three-dimensional part.

20 Claims, 26 Drawing Sheets

(51) Int. Cl.
*B33Y 30/00* (2015.01)
*B22F 3/105* (2006.01)
*B22F 5/10* (2006.01)
*B33Y 10/00* (2015.01)
*B29C 64/106* (2017.01)
*B29C 64/40* (2017.01)
*B33Y 50/02* (2015.01)

(52) U.S. Cl.
CPC ... *B22F 2003/1058* (2013.01); *B22F 2999/00* (2013.01); *B33Y 50/02* (2014.12); *Y02P 10/295* (2015.11)

(56) References Cited

U.S. PATENT DOCUMENTS

| | | | |
|---|---|---|---|
| 5,121,329 A | 6/1992 | Crump | |
| 5,169,081 A | 12/1992 | Goedderz | |
| 5,303,141 A * | 4/1994 | Batchelder | B29C 41/36 156/244.11 |
| 5,312,224 A | 5/1994 | Batchelder et al. | |
| 5,340,433 A | 8/1994 | Crump | |
| 5,370,467 A | 12/1994 | Ikehata et al. | |
| 5,503,785 A | 4/1996 | Crump et al. | |
| 5,738,817 A | 4/1998 | Danforth et al. | |
| 5,764,521 A | 6/1998 | Batchelder et al. | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,561 A | 10/1999 | Batchelder et al. | |
| 5,975,493 A | 11/1999 | Ellingson et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,193,923 B1 | 2/2001 | Leyden et al. | |
| 6,228,923 B1 | 5/2001 | Lombardi et al. | |
| 6,257,517 B1 | 7/2001 | Babish et al. | |
| 6,505,089 B1 | 1/2003 | Yang et al. | |
| 6,547,995 B1 | 4/2003 | Comb | |
| 6,645,412 B2 | 11/2003 | Priedeman, Jr. | |
| 6,685,866 B2 | 2/2004 | Swanson et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,790,403 B1 | 9/2004 | Priedeman, Jr. et al. | |
| 6,814,907 B1 | 11/2004 | Comb | |
| 6,830,643 B1 | 12/2004 | Hayes | |
| 6,869,559 B2 | 3/2005 | Hopkins | |
| 6,923,634 B2 | 8/2005 | Swanson et al. | |
| 6,998,087 B1 | 2/2006 | Hanson et al. | |
| 7,122,246 B2 | 10/2006 | Comb et al. | |
| 7,172,715 B2 | 2/2007 | Swanson et al. | |
| 7,236,166 B2 | 6/2007 | Zinniel | |
| 7,384,255 B2 | 6/2008 | Labossiere | |
| 7,604,470 B2 | 10/2009 | LaBossiere et al. | |
| 7,604,768 B2 | 10/2009 | Kritchman | |
| 7,625,200 B2 | 12/2009 | Leavitt | |
| 7,891,964 B2 | 2/2011 | Skubic et al. | |
| 7,896,209 B2 | 3/2011 | Batchelder et al. | |
| 7,938,351 B2 | 5/2011 | Taatjes et al. | |
| 7,938,356 B2 | 5/2011 | Taatjes et al. | |
| 8,033,811 B2 | 10/2011 | Swanson et al. | |
| 8,075,300 B2 | 12/2011 | Zinniel | |
| 8,123,999 B2 | 2/2012 | Priedeman, Jr. et al. | |
| 8,153,182 B2 | 4/2012 | Comb et al. | |
| 8,221,669 B2 | 7/2012 | Batchelder et al. | |
| 8,226,395 B2 | 7/2012 | Pax et al. | |
| 8,459,280 B2 | 6/2013 | Swanson et al. | |
| 9,168,697 B2 * | 10/2015 | Crump | B29C 67/0085 |
| 9,327,350 B2 * | 5/2016 | Mannella | B22F 3/1055 |
| 2004/0182510 A1 | 9/2004 | Pfeifer et al. | |
| 2005/0129941 A1 | 6/2005 | Comb et al. | |
| 2007/0003656 A1 | 1/2007 | LaBossiere et al. | |
| 2007/0228590 A1 | 10/2007 | LaBossiere et al. | |
| 2008/0121172 A1 | 5/2008 | Kritchman et al. | |
| 2008/0169585 A1 | 7/2008 | Zinniel | |
| 2008/0213419 A1 | 9/2008 | Skubic et al. | |
| 2008/0288083 A1 | 11/2008 | Axelsson et al. | |
| 2009/0020901 A1 * | 1/2009 | Schillen | B29C 70/88 264/31 |
| 2009/0035405 A1 | 2/2009 | Leavitt | |
| 2009/0072447 A1 * | 3/2009 | Hull | B33Y 40/00 264/401 |
| 2009/0101278 A1 | 4/2009 | Laberge-Lebel et al. | |
| 2009/0263582 A1 | 10/2009 | Batchelder | |
| 2009/0273122 A1 | 11/2009 | Batchelder et al. | |
| 2009/0274540 A1 | 11/2009 | Batchelder et al. | |
| 2010/0005987 A1 | 1/2010 | Shapira | |
| 2010/0086721 A1 | 4/2010 | Batchelder | |
| 2010/0096072 A1 | 4/2010 | Hopkins et al. | |
| 2010/0096485 A1 | 4/2010 | Taatjes et al. | |
| 2010/0096489 A1 | 4/2010 | Taatjes et al. | |
| 2010/0100224 A1 | 4/2010 | Comb et al. | |
| 2010/0283172 A1 | 11/2010 | Swanson | |
| 2010/0327479 A1 | 12/2010 | Zinniel et al. | |
| 2011/0054663 A1 | 3/2011 | Matsui et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2011/0117268 A1 | 5/2011 | Batchelder et al. | |
| 2011/0121476 A1 | 5/2011 | Batchelder et al. | |
| 2011/0233804 A1 | 9/2011 | Batchelder et al. | |
| 2012/0046779 A1 | 2/2012 | Pax et al. | |
| 2012/0067501 A1 | 3/2012 | Lyons | |
| 2012/0068378 A1 | 3/2012 | Swanson et al. | |
| 2012/0070523 A1 | 3/2012 | Swanson et al. | |
| 2012/0162314 A1 | 6/2012 | Swanson et al. | |
| 2012/0164256 A1 | 6/2012 | Swanson et al. | |
| 2012/0164330 A1 | 6/2012 | Swanson et al. | |
| 2013/0026680 A1 * | 1/2013 | Ederer | B22F 3/105 264/401 |
| 2013/0269731 A1 | 10/2013 | Crouch et al. | |

FOREIGN PATENT DOCUMENTS

| | | | |
|---|---|---|---|
| JP | 2004148198 A | | 5/2004 |
| KR | 20080072788 A | | 8/2008 |
| KR | 2012006024 A | | 6/2012 |
| WO | 2012037329 A2 | | 3/2012 |

OTHER PUBLICATIONS

International Search Report and Written Opinion dated Nov. 1, 2013, for International Application No. PCT/US2013/055308.
International Search Report and Written Opinion dated Oct. 22, 2013, from International Application No. PCT/US2013/055311.
U.S. Appl. No. 13/334,910, filed Dec. 22, 2011, entitled "Spool Assembly for Additive Manufacturing System, and Methods of Manufacture and Use Thereof".
U.S. Appl. No. 13/334,921, filed Dec. 22, 2011, entitled "Consumable Assembly with Payout Tube for Additive Manufacturing System".
www.envisiontec.com, "3D-Bioplotter", Datasheet, Mar. 2011.

* cited by examiner

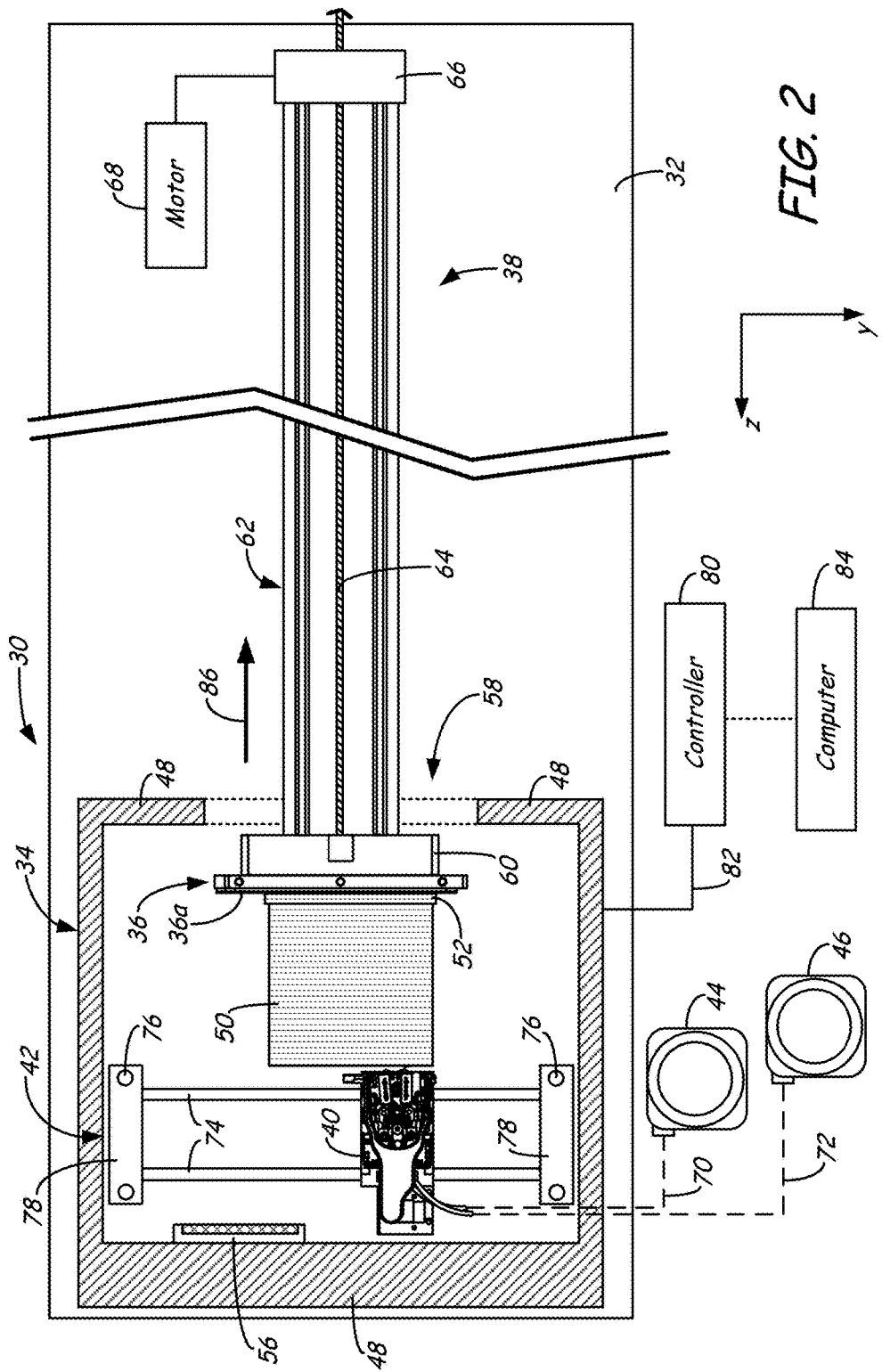

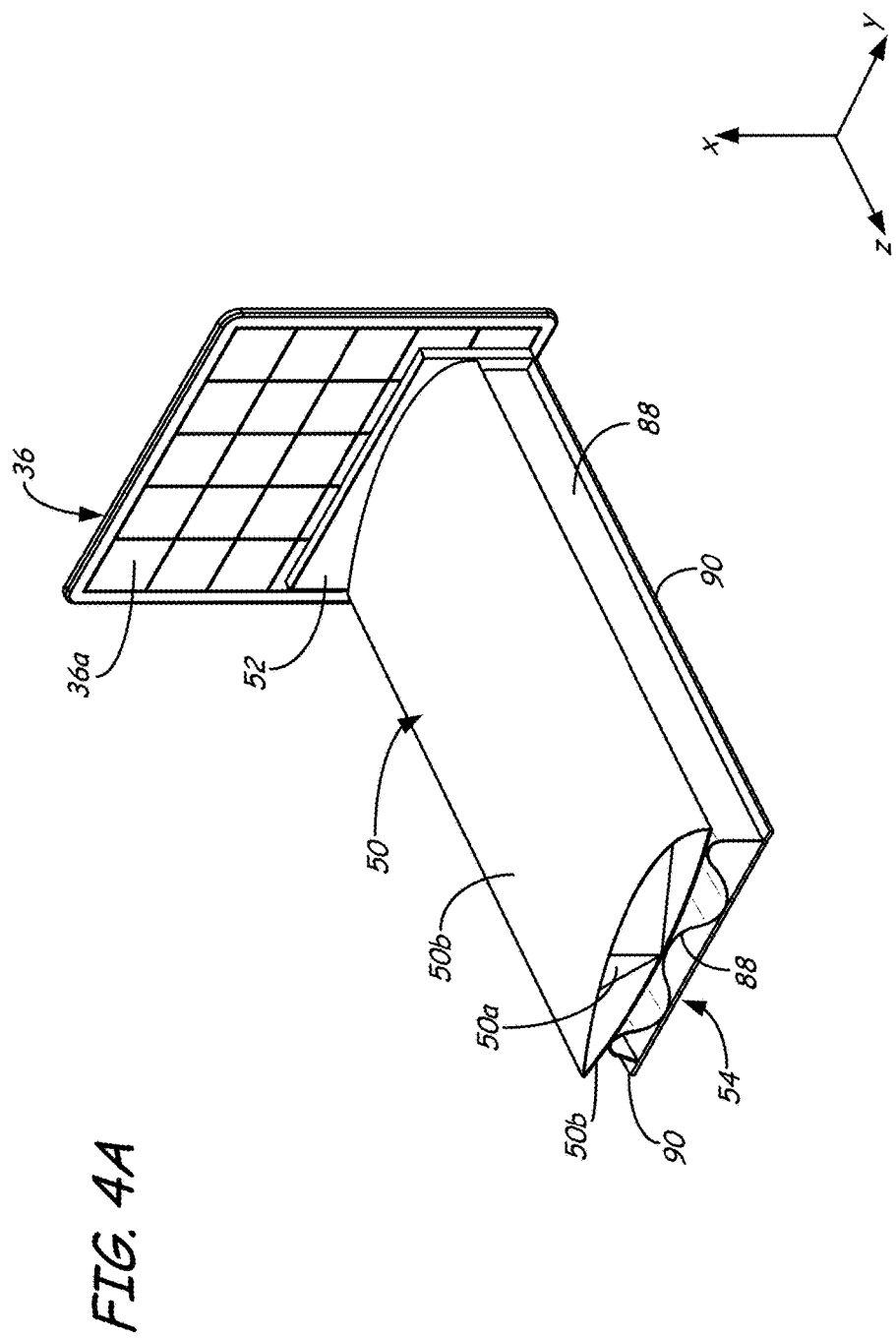

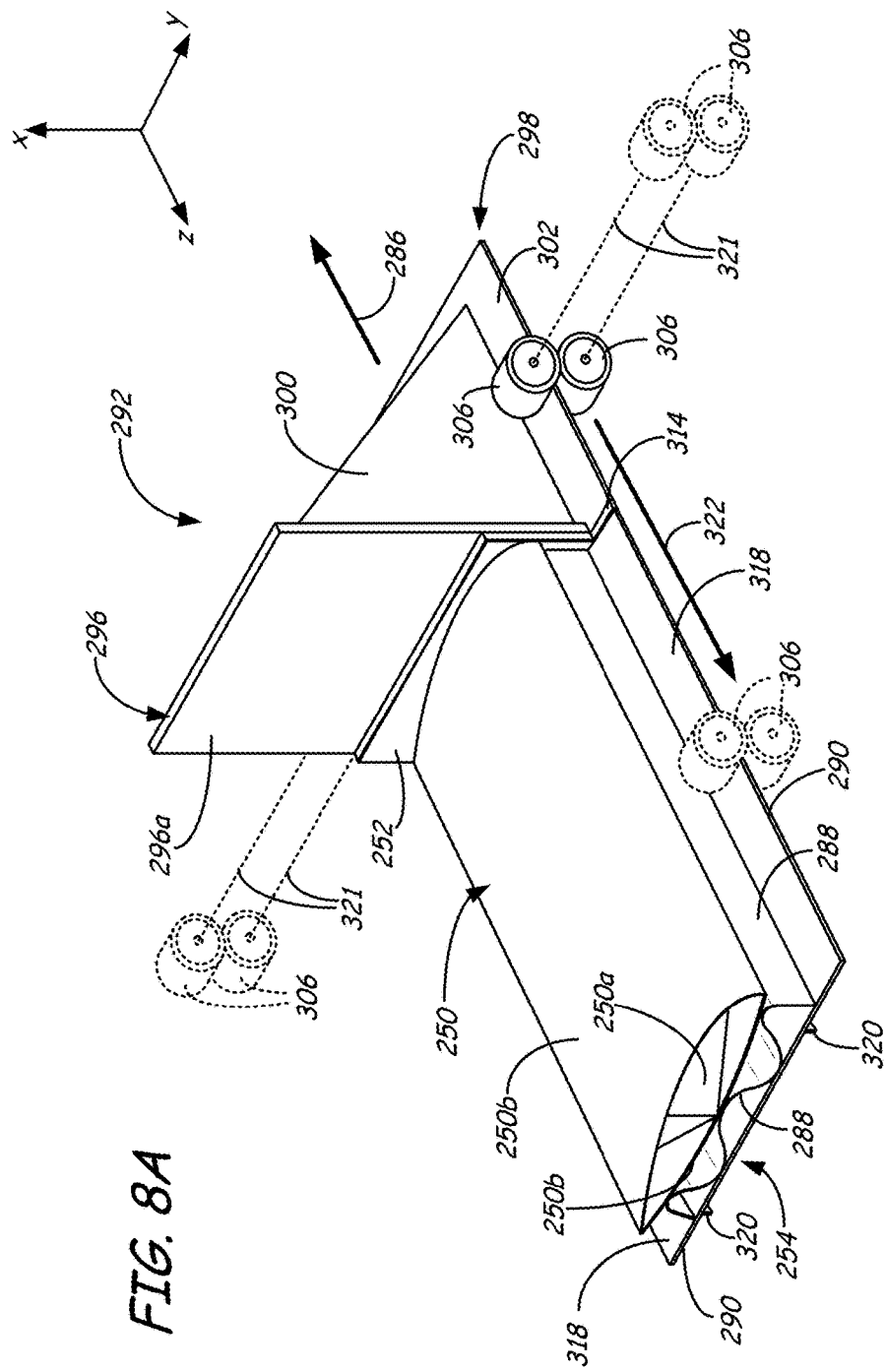

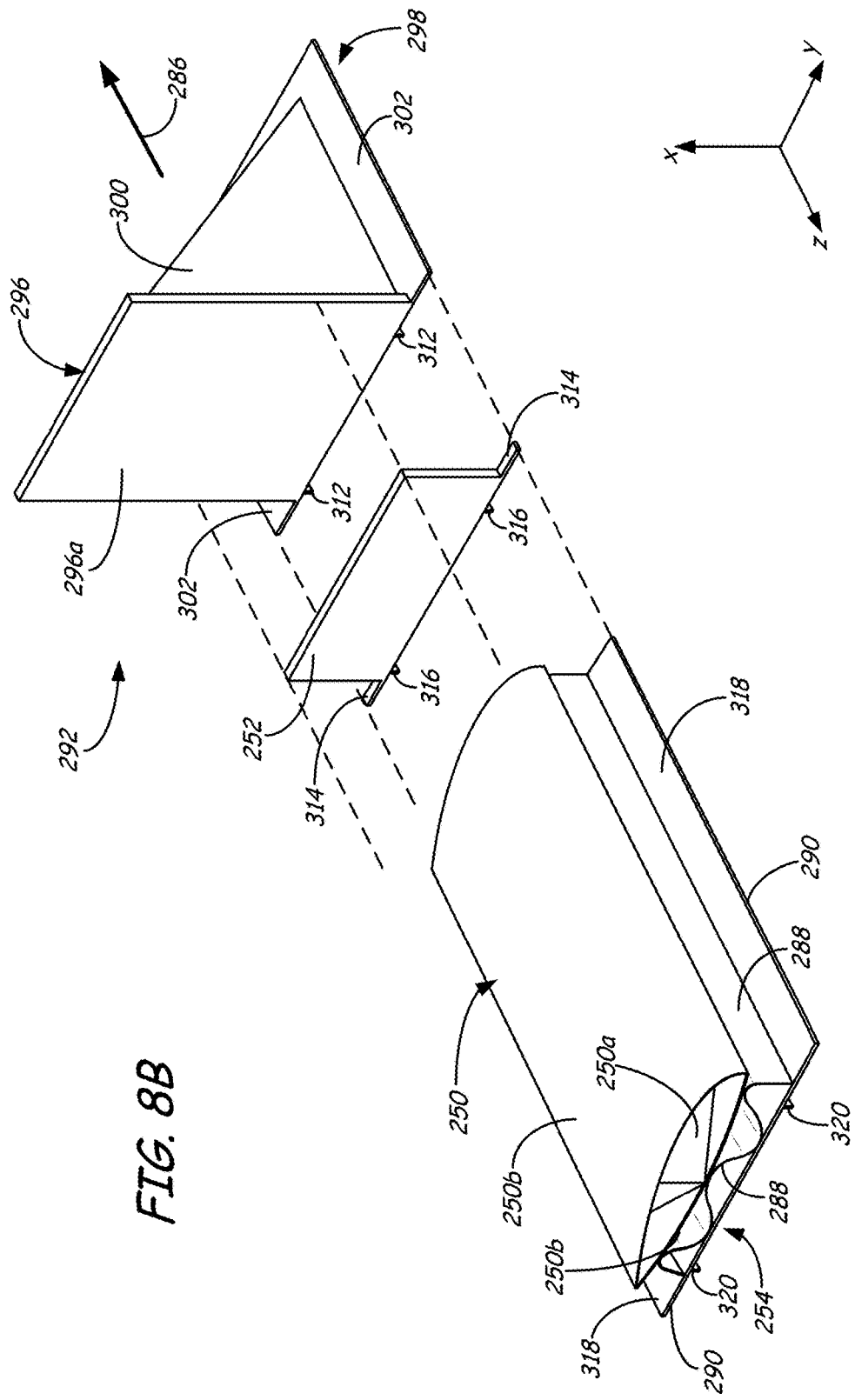

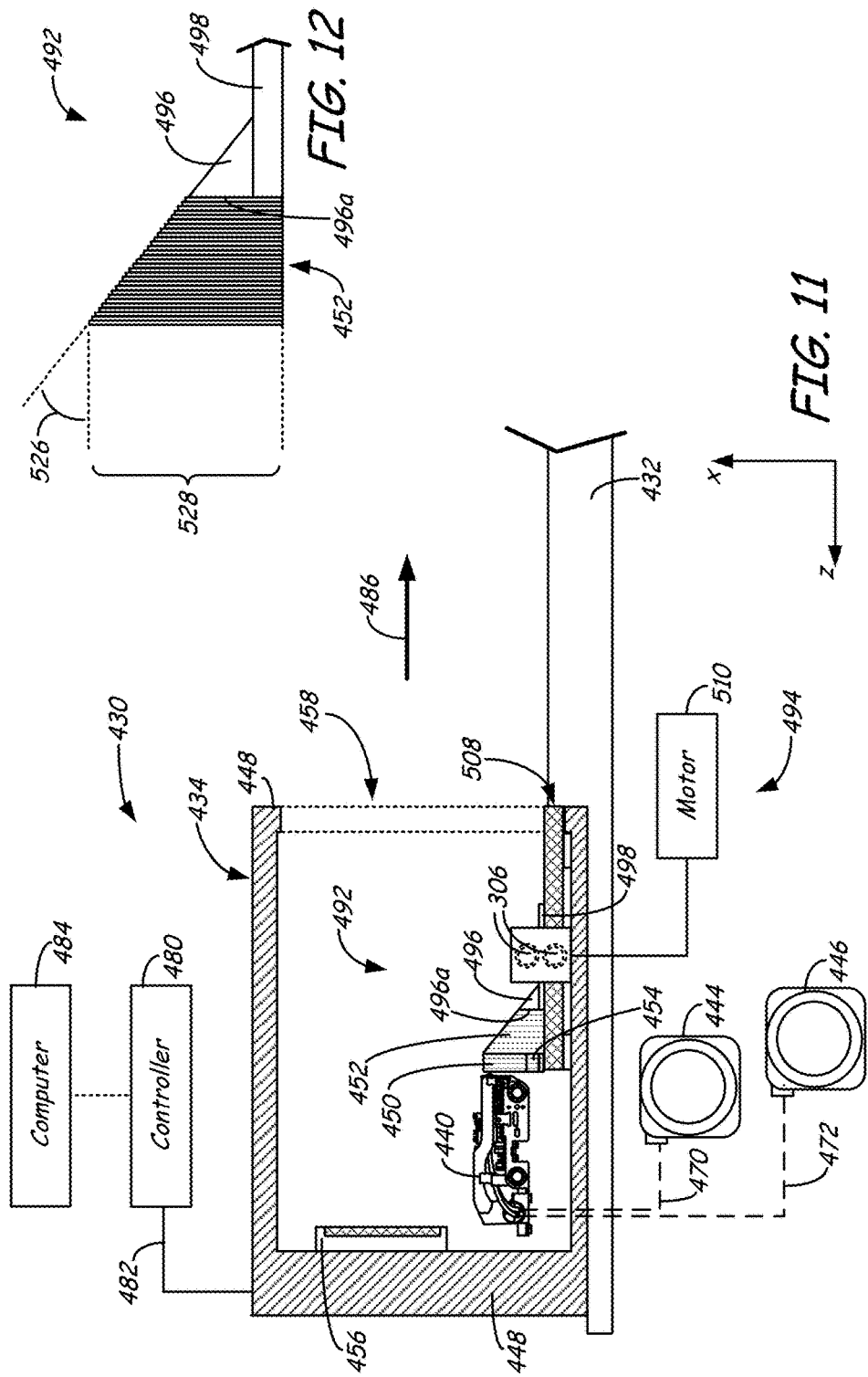

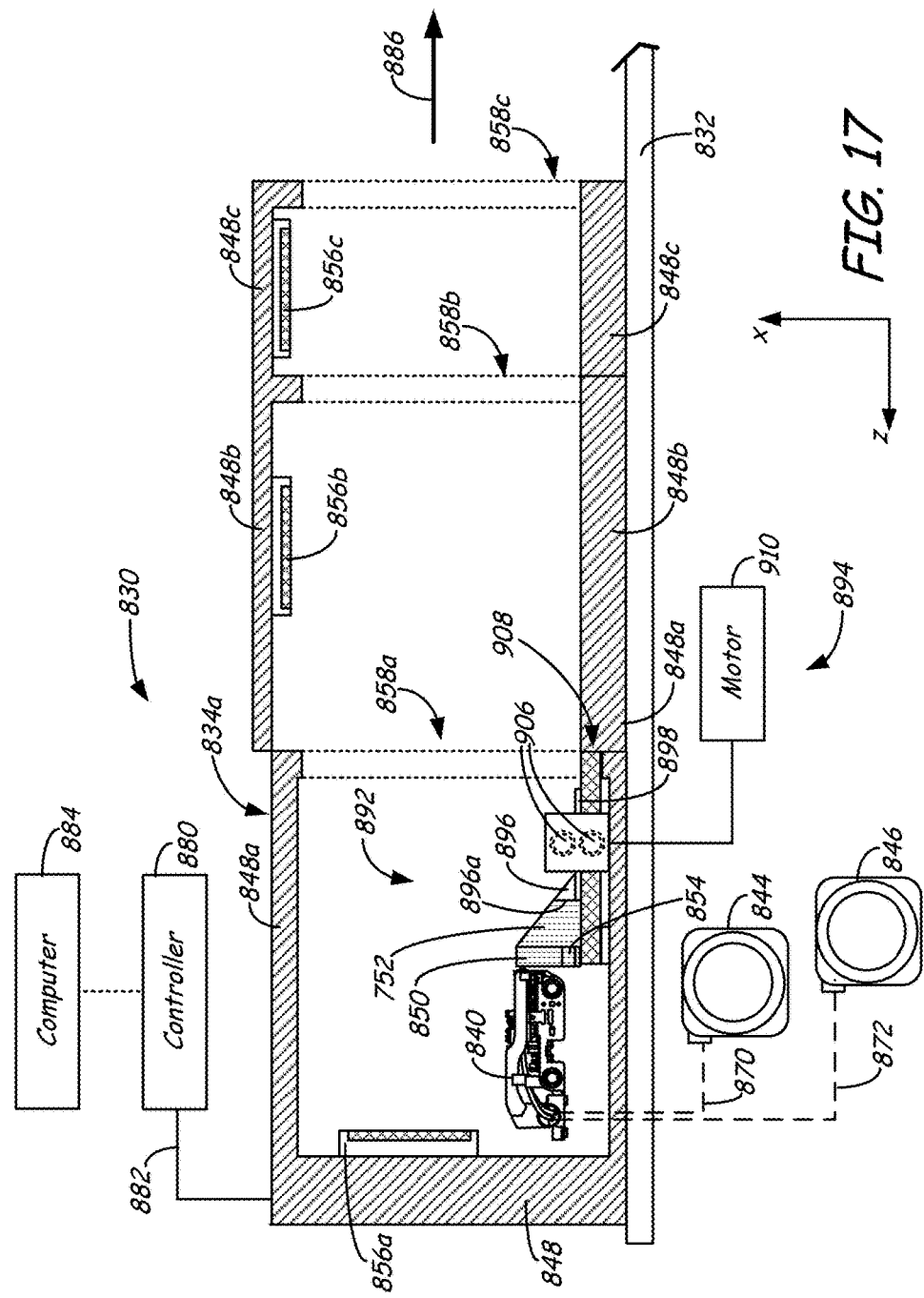

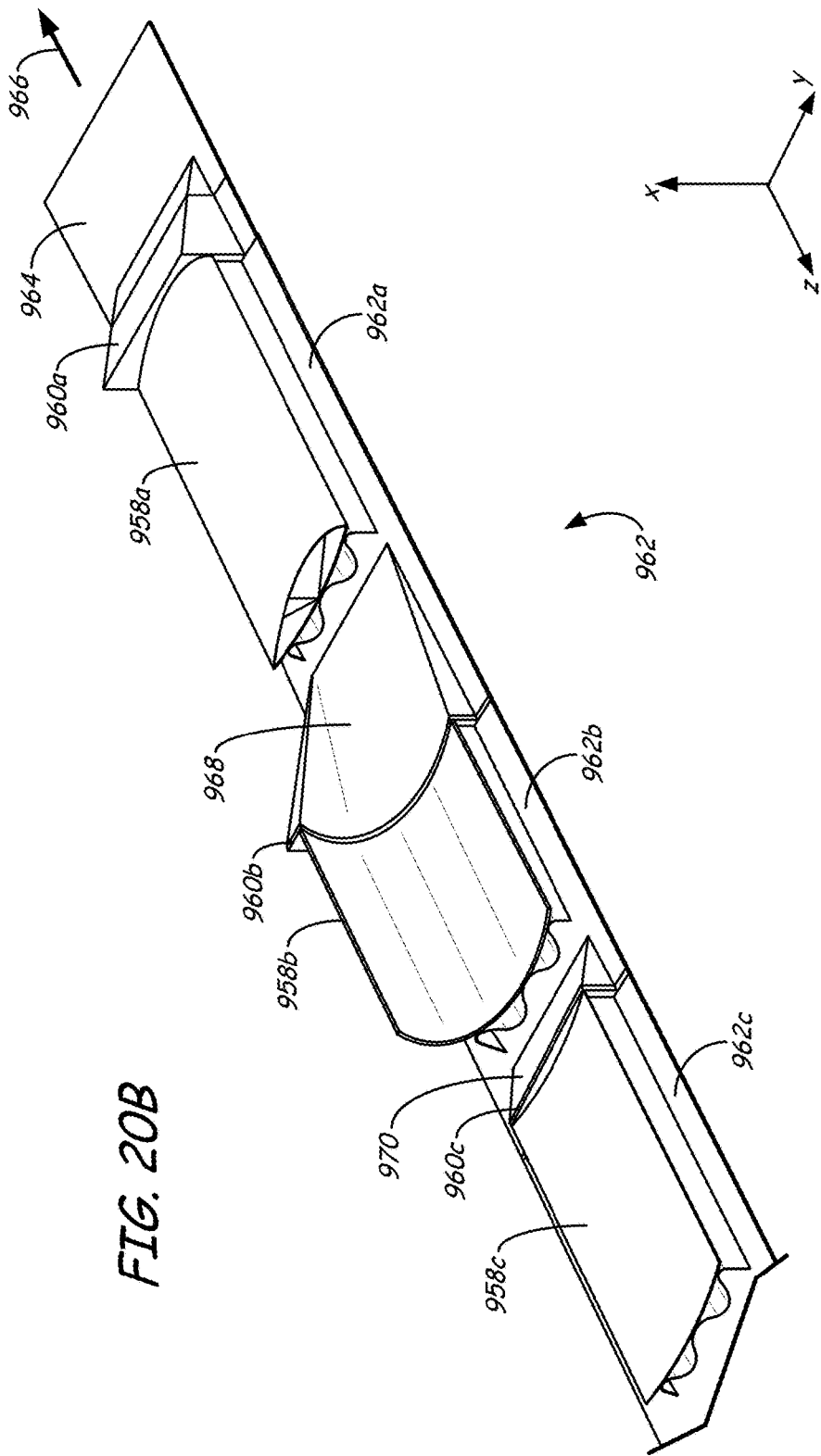

ADDITIVE MANUFACTURING TECHNIQUE FOR PRINTING THREE-DIMENSIONAL PARTS WITH PRINTED RECEIVING SURFACES

CROSS-REFERENCE TO RELATED APPLICATION(S)

This Application is a Continuation Application of U.S. patent application Ser. No. 13/587,015, filed Aug. 16, 2012; the contents of which are hereby incorporated by reference in their entireties. Reference is also hereby made to co-filed U.S. patent application Ser. No. 13/587,002, entitled "Print Head Nozzle For Use With Additive Manufacturing System".

Reference is also hereby made to co-filed U.S. patent application Ser. No. 13/587,006, entitled "Draw Control For Additive Manufacturing Systems".

Reference is also hereby made to co-filed U.S. patent application No. 13/587,009, entitled "Additive Manufacturing System With Extended Printing Volume, And Methods Of Use Thereof".

Reference is also hereby made to co-filed U.S. patent application Ser. No. 13/587,012, entitled "Method For Printing Three-Dimensional Parts With Additive Manufacturing Systems Using Scaffolds".

BACKGROUND

The present disclosure relates to additive manufacturing systems for building three-dimensional (3D) parts with layer-based, additive manufacturing techniques. In particular, the present disclosure relates to additive manufacturing systems for printing large 3D parts, and methods for printing 3D parts in the additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, one or more tool paths are then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip or nozzle carried by a print head of the system, and is deposited as a sequence of roads on a substrate in an x-y plane while the print head moves along the tool paths. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for printing three-dimensional parts with an additive manufacturing system. The method includes printing successive layers along a printing axis onto a first receiving surface of a print foundation, wherein the printed successive layers have increasing cross-sectional areas parallel to a build plane that is normal to the printing axis, where a last layer of the printed successive layers defines a second receiving surface. The method also includes printing layers of a three-dimensional part onto the second receiving surface, wherein the last layer of the printed successive layers has a first cross-sectional area parallel to the build plane, where a first layer defines of the three-dimensional part has a second cross-sectional area parallel to the build plane, and wherein the first cross-sectional area is at least as large as the second cross-sectional area.

Another aspect of the present disclosure is directed to a method for printing three-dimensional parts with an additive manufacturing system, which includes providing a first cross-sectional area of a receiving surface parallel to a build plane, providing a footprint area of a three-dimensional part parallel to the build plane, and generating tool paths for successive layers that increase in cross-sectional areas parallel to the build plane from the first cross-sectional area to at least the footprint area of the three-dimensional part. The method also includes printing the successive layers with the additive manufacturing system onto the receive surface based on the generated tool paths, and printing a three-dimensional part onto the printed successive layers.

Another aspect of the present disclosure is directed to a method for printing three-dimensional parts with an additive manufacturing system, which includes printing a scaffold along a printing axis with the additive manufacturing system, where the printed scaffold comprises a plurality of successive wedge portions offset along the printing axis, and where each wedge portion has a receiving surface with a cross-sectional area parallel to a build plane that is normal to the printing axis. The method also includes printing a three-dimensional part onto each printed receiving surface, such that each three-dimensional part is associated with one of the receiving surfaces, where each three-dimensional part has a cross-sectional area parallel to the build plane that is less than or equal to the cross-sectional area of its associated receiving surface.

DEFINITIONS

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis. Furthermore, in embodiments in which the printed layers are planar, the printing axis is normal to the build plane of the layers.

The term "printing onto", such as for "printing a 3D part onto a print foundation" includes direct and indirect printings onto the print foundation. A "direct printing" involves depositing a flowable material directly onto the print foundation to form a layer that adheres to the print foundation. In comparison, an "indirect printing" involves depositing a flowable material onto intermediate layers that are directly printed onto the receiving surface. As such, printing a 3D part onto a print foundation may include (i) a situation in which the 3D part is directly printed onto to the print foundation, (ii) a situation in which the 3D part is directly printed onto intermediate layer(s) (e.g., of a support structure), where the intermediate layer(s) are directly printed onto the print foundation, and (iii) a combination of situations (i) and (ii).

The term "providing", such as for "providing a chamber" and the like, when recited in the claims, is not intended to require any particular delivery or receipt of the provided item. Rather, the term "providing" is merely used to recite items that will be referred to in subsequent elements of the claim(s), for purposes of clarity and ease of readability.

BRIEF DESCRIPTION OF THE DRAWINGS

FIG. 2 is a top view of a first example additive manufacturing system of the present disclosure having a platen and platen gantry for printing a 3D part horizontally.

FIG. 4A is a perspective view of a 3D part, support structure, and scaffold printed on the platen.

FIG. 8A is a perspective view of a 3D part, support structure, and scaffold printed on the platen starter piece.

FIG. 8B is an exploded perspective view of the 3D part, support structure, and scaffold printed on the platen starter piece.

FIG. 11 is a side view of the third example system.

FIG. 12 is an expanded side view of the wedge starter piece, illustrating a technique for printing a support structure.

FIG. 17 is a side view of a fifth example additive manufacturing system of the present disclosure having a multiple chambers for providing multiple temperature zones.

FIGS. 20A and 20B are perspective views of multiple 3D parts, support structures, and a scaffold printed on a wedge starter piece, illustrating a scaffolding technique for printing multiple, successive 3D parts.

DETAILED DESCRIPTION

The present disclosure is directed to an additive manufacturing system having an extended printing volume for printing long or tall 3D parts. The additive manufacturing system includes a heated chamber having a port that opens the chamber to ambient conditions outside of the chamber. The system also includes one or more print heads configured to print a 3D part in a layer-by-layer manner onto a print foundation (e.g., a platen or other component having a receiving surface) in the heated chamber.

As the printed 3D part grows on the print foundation, the print foundation may be indexed or otherwise moved through the port. The printed 3D part may continue to grow out of the port until a desired length or height is achieved. The use of the port expands the printable volume along a printing axis of the system, allowing long or tall 3D parts, such as airfoils, manifolds, fuselages, and the like to be printed in a single printing operation. As such, the 3D parts may be larger than the dimensions of the additive manufacturing system.

As discussed further below, the additive manufacturing system may be configured to print 3D parts in a horizontal direction, a vertical direction, or along other orientations (e.g., slopes relative to the horizontal and vertical directions). In each of these embodiments, the layers of a printed 3D part may be stabilized by one or more printed "scaffolds", which brace the 3D part laterally relative to the printing axis of the system to address forces parallel to the build plane. This is in comparison to a printed "support structure", which supports a bottom surface of the 3D part relative to the printing axis of the system to address forces that are normal to the build plane.

Figure 1A:
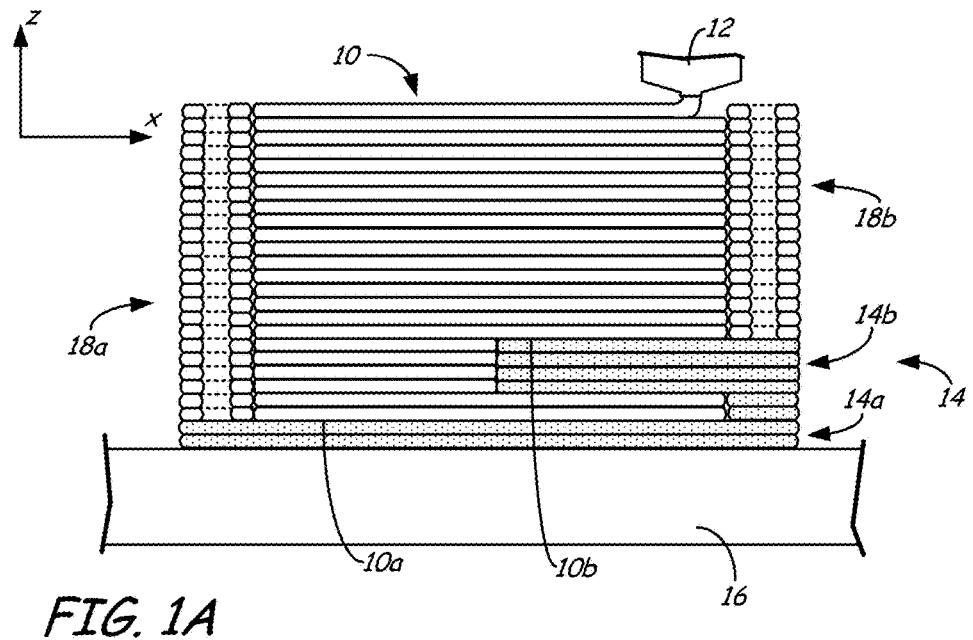
FIG. 1A is a side view of a 3D part being printed with a support structure and scaffold, illustrating a vertical printing axis.

For example, FIG. 1A is a simplified front view of 3D part 10 being printed in a layer-by-layer manner from print head nozzle 12, where the layers of the 3D part 10 grow along the vertical z-axis. As such, the "printing axis" in FIG. 1A is the vertical z-axis, and each layer extends parallel to a horizontal x-y build plane (y-axis not shown).

The layers of 3D part 10 are printed on layers of support structure 14, which are correspondingly disposed on platen 16. Support structure 14 includes a first series of printed layers 14a that support the bottom surface 10a of 3D part 10 along the printing axis (i.e., along the vertical z-axis), thereby address forces that are normal to the build plane. Layers 14a assist in adhering 3D part 10 to platen 16 or other suitable print foundation, and for reducing the risk of having layers 14a curl, while also allowing 3D part 10 to be removed from platen 16 without damaging 3D part 10. In addition, support structure 14 includes a second series of printed layers 14b that support overhanging surface 10b of 3D part 10 along the printing axis. In each instance, the layers of support structure 14 (e.g., layers 14a and 14b) support the bottom surfaces of 3D part 10 (e.g., bottom surfaces 10a and 10b) along the printing axis, thereby further addressing forces that are normal to the build plane.

In comparison, layers of scaffolds 18a and 18b are printed at lateral locations relative to 3D part 10 and are not used to support bottom surfaces 10a and 10b. Rather, scaffolds 18a and 18b, illustrated as tubular scaffolds extending along the z-axis, are printed to brace the lateral sides of 3D part 10 to function as buttresses to address forces parallel to the build plane. For example, in some instances, such as when 3D part 10 is tall and narrow, the adhesion between layers 14a and 3D part 10 may not be sufficient to prevent the top-most layers of 3D part 10 from wobbling during the printing operation. The wobbling of 3D part 10 can reduce the registration between print head nozzle 12 and 3D part 10, potentially resulting in reduced printing accuracies. Scaffolds 18a and 18b, however, provide a suitable mechanism to brace 3D part 10 at one or more lateral locations relative to the printing axis (i.e., the vertical z-axis), to stabilize 3D part 10 against wobbling.

Figure 1B:
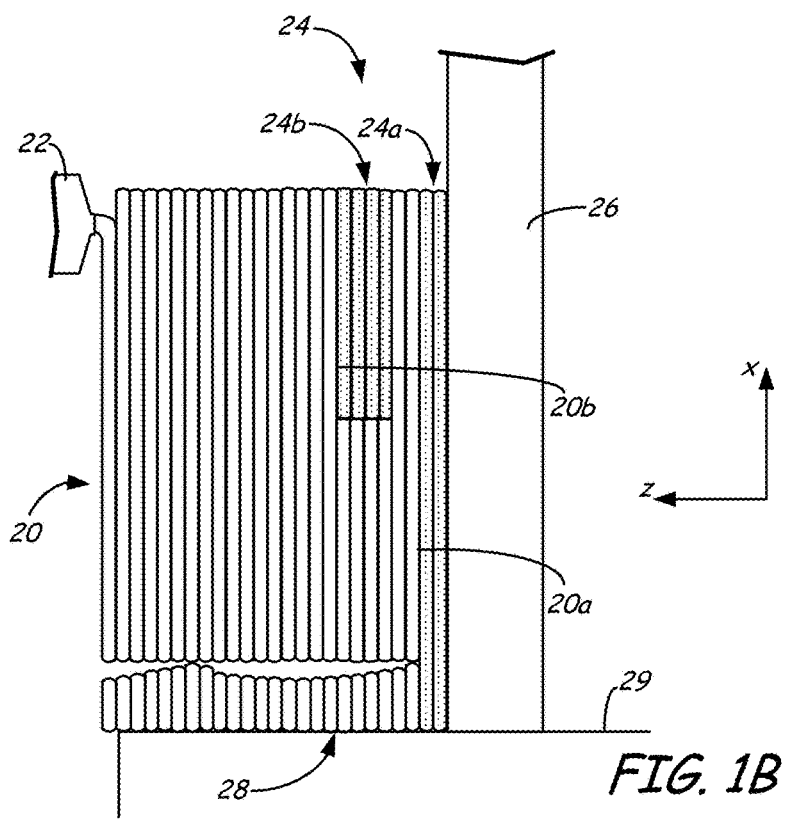
FIG. 1B is a side view of a 3D part being printed with a support structure and scaffold, illustrating a horizontal printing axis.

Alternatively, FIG. 1B shows 3D part 20 being printed in a layer-by-layer manner from print head nozzle 22, where the layers of the 3D part 20 grow horizontally along the z-axis. As such, the "printing axis" in FIG. 1B is a horizontal z-axis axis, and each layer extends parallel to a vertical x-y build plane (y-axis not shown).

In this situation, the layers of 3D part 20 are printed on layers of support structure 24, which are correspondingly disposed on platen 26. Support structure 24 includes a first series of printed layers 24a that support the bottom surface 20a of 3D part 20 along the printing axis (i.e., along the horizontal z-axis), and a second series of printed layers 14b that support overhanging surface 20b of 3D part 20 along the printing axis. In each instance, the layers of support structure 24 (e.g., layers 24a and 24b) support the bottom surfaces of 3D part 20 (e.g., bottom surfaces 20a and 20b) along the printing axis to address forces that are normal to the build plane.

In comparison, layers of scaffold 28 are printed at lateral locations relative to the layers of 3D part 20 and are not used to support bottom surfaces 20a and 20b. Rather, scaffold 28 is printed to brace the lateral side of 3D part 20 relative to the printing axis, which is the vertical bottom side of 3D part 20 in the view shown in FIG. 1B. In this horizontal situation, scaffold 28 braces 3D part 20, preventing 3D part 20 from sagging in a direction parallel to the build plane under gravity during the printing operation.

For example, in some instances, such as when 3D part 20 is long and narrow, the cantilevered adhesion between layers 24a and 3D part 20 may not be sufficient to prevent the remote-most layers of 3D part 20 from sagging under gravity during the printing operation. As such, scaffold 28 provides a suitable mechanism to brace 3D part 20 at one or more lateral locations relative to the printing axis (i.e., the horizontal z-axis), reducing the risk of sagging. Scaffold 28 itself can then rest on and slide along an underlying surface 29 in the y-z plane.

For ease of discussion, the z-axis is used herein when referring to the printing axis regardless of the printing orientation. For a vertical printing operation, such as shown in FIG. 1A, the printing z-axis is the a vertical axis, and each layer of the 3D part, support structure, and scaffold extend along the horizontal x-y build plane. Alternatively, for a horizontal printing operation, such as shown in FIG. 1B, the printing z-axis is a horizontal axis, and each layer of the 3D part, support structure, and scaffold extend along the vertical x-y build plane. In further alternative embodiments, the layers of 3D parts, support structures, and scaffolds may be grown along any suitable axis.

Additionally, while FIGS. 1A and 1B illustrate flat build planes (i.e., each layer is planar), in further alternative embodiments, the layers of the 3D parts, support structures, and/or scaffolds may be non-planar. For example, the layers of a given 3D part may each exhibit gentle curvatures from a flat build plane. In these embodiments, the build plane may be determined as an average plane of the curvatures. Unless expressly stated otherwise, the term "build plane" is not intended to be limited to a flat plane.

As further discussed below, in some embodiments, the receiving surfaces on which the 3D parts, support structures, and/or scaffolds are printed on may have cross-sectional areas in the build plane that are smaller than the footprint areas of the 3D parts, support structures, and/or scaffolds. For example, the receiving surface of a print foundation may have a cross-sectional area that is smaller than the footprint areas of an intended 3D part. In this situation, layers of a support structure and/or scaffold may be printed with increasing cross-sectional areas until they at least encompass the footprint areas of the intended 3D part. This allows small print foundations to be used with the additive manufacturing systems of the present disclosure. Furthermore, this allows multiple, successive 3D parts to be printed with scaffolds that function as receiving surfaces.

Horizontal Printing

FIGS. 2-14 illustrate example additive manufacturing systems of the present disclosure having extended printing volumes for printing long 3D parts horizontally, such as discussed above for 3D part 20 (shown in FIG. 1B). FIGS. 2-5 illustrate system 30, which is a first example additive manufacturing system for printing or otherwise building 3D parts, support structures, and/or scaffolds horizontally using a layer-based, additive manufacturing technique. Suitable systems for system 30 include extrusion-based additive manufacturing systems developed by Stratasys, Inc., Eden Prairie, MN. under the trademarks "FDM" and "FUSED DEPOSITION MODELING", which are oriented such that the printing z-axis is a horizontal axis.

As shown in FIG. 2, system 30 may rest on a table or other suitable surface 32, and includes chamber 34, platen 36, platen gantry 38, print head 40, head gantry 42, and consumable assemblies 44 and 46. Chamber 34 is an enclosed environment having chamber walls 48, and initially contains platen 36 for printing 3D parts (e.g., 3D part 50), support structures (e.g., support structure 52), and/or scaffolds (e.g., scaffold 54, shown in FIGS. 3-5).

In the shown embodiment, chamber 34 includes heating mechanism 56, which may be any suitable mechanism configured to heat chamber 34, such as one or more heaters and air circulators to blow heated air throughout chamber 34. Heating mechanism 56 may heat and maintain chamber 34, at least in the vicinity of print head 40, at one or more temperatures that are in a window between the solidification temperature and the creep relaxation temperature of the part material and/or the support material. This reduces the rate at which the part and support materials solidify after being extruded and deposited (e.g., to reduce distortions and curling), where the creep relaxation temperature of a material is proportional to its glass transition temperature. Examples of suitable techniques for determining the creep relaxation temperatures of the part and support materials are disclosed in Batchelder et al., U.S. Pat. No. 5,866,058.

Chamber walls 48 maybe any suitable barrier to reduce the loss of the heated air from the build environment within chamber 34, and may also thermally insulate chamber 34. As shown, chamber walls 48 include port 58 extending laterally therethrough to open chamber 34 to ambient conditions outside of system 30. Accordingly, system 30 exhibits a thermal gradient at port 58, with one or more elevated temperatures within chamber 34 that drop to the ambient temperature outside of chamber 34 (e.g., room temperature, about 25° C.).

In some embodiments, system 30 may be configured to actively reduce the heat loss through port 58, such as with an air curtain, thereby improving energy conservation. Furthermore, system 30 may also include one or more permeable barriers at port 58, such as insulating curtain strips, a cloth or flexible lining, bristles, and the like, which restrict air flow out of port 58, while allowing platen 36 to pass therethrough.

Platen 36 is a print foundation having receiving surface 36a, where 3D part 50, support structure 52, and scaffold 54 are printed horizontally in a layer-by-layer manner onto receiving surface 36a. In some embodiments, platen 36 may also include a flexible polymeric film or liner, which may function as receiving surface 36a. Platen 36 is supported by platen gantry 38, which is a gantry-based drive mechanism configured to index or otherwise move platen 36 along the printing z-axis. Platen gantry 38 includes platen mount 60, guide rails 62, screw 64, screw drive 66, and motor 68.

Platen mount 60 is a rigid structure that retains platen 36 such that receiving surface 36a is held parallel to the x-y plane. Platen mount 60 is slidably coupled to guide rails 62, which function as linear bearings to guide platen mount 60 along the z-axis, and to limit the movement of platen 36 to directions along the z-axis (i.e., restricts platen 36 from moving in the x-y plane). Screw 64 has a first end coupled to platen mount 60 and a second portion engaged with screw drive 66. Screw drive 66 is configured to rotate and draw screw 64, based on rotational power from motor 68, to index platen 36 along the z-axis.

In the shown example, print head 40 is a dual-tip extrusion head configured to receive consumable filaments or other materials from consumable assemblies 44 and 46 (e.g., via guide tubes 70 and 72) for printing 3D part 50, support structure 52, and scaffold 54 onto receiving surface 36a of platen 36. Examples of suitable devices for print head 40 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182.

In additional embodiments, in which print head 40 is an interchangeable, single-nozzle print head, examples of suitable devices for each print head 40, and the connections between print head 40 and head gantry 42 include those disclosed in Swanson et al., U.S. Patent Application Publication No. 2012/0164256.

Print head 40 is supported by head gantry 42, which is a gantry assembly configured to move print head 40 in (or substantially in) the x-y plane parallel to platen 36. For example, head gantry 42 may include y-axis rails 74, x-axis rails 76, and bearing sleeves 78. Print head 40 is slidably coupled to y-axis rails 74 to move along the horizontal y-axis (e.g., via one or more motor-driven belts and/or screws, not shown). Y-axis rails 74 are secured to bearing sleeves 78, which themselves are slidably coupled to x-axis rails 76, allowing print head 40 to also move along the vertical x-axis, or in any direction in the x-y plane (e.g., via the motor-driven belt(s), not shown). While the additive manufacturing systems discussed herein are illustrated as printing in a Cartesian coordinate system, the systems may alternatively operate in a variety of different coordinate systems. For example, head gantry 42 may move print head 40 in a polar coordinate system, providing a cylindrical coordinate system for system 30.

Suitable devices for consumable assemblies 44 and 46 include those disclosed in Swanson et al., U.S. Pat. No. 6,923,634; Comb et al., U.S. Pat. No. 7,122,246; Taatjes et al, U.S. Pat. Nos. 7,938,351 and 7,938,356; Swanson, U.S. Patent Application Publication No. 2010/0283172; and Mannella et al., U.S. patent application Ser. Nos. 13/334,910 and 13/334,921.

Suitable materials and filaments for use with print head 40 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication Nos. 2009/0263582, 2011/0076496, 2011/0076495, 2011/0117268, 2011/0121476, and 2011/0233804; and Hopkins et al., U.S. Patent Application Publication No. 2010/0096072. Examples of suitable average diameters for the filaments range from about 1.02 millimeters (about 0.040 inches) to about 3.0 millimeters (about 0.120 inches).

System 30 also includes controller 80, which is one or more control circuits configured to monitor and operate the components of system 30. For example, one or more of the control functions performed by controller 80 can be implemented in hardware, software, firmware, and the like, or a combination thereof. Controller 80 may communicate over communication line 82 with chamber 34 (e.g., heating mechanism 56), print head 40, motor 68, and various sensors, calibration devices, display devices, and/or user input devices.

In some embodiments, controller 80 may also communicate with one or more of platen 36, platen gantry 38, head gantry 42, and any other suitable component of system 30.

While illustrated as a single signal line, communication line 82 may include one or more electrical, optical, and/or wireless signal lines, allowing controller 80 to communicate with various components of system 30. Furthermore, while illustrated outside of system 30, controller 80 and communication line 82 are desirably internal components to system 30.

System 30 and/or controller 80 may also communicate with computer 84, which is one or more computer-based systems that communicates with system 30 and/or controller 80, and may be separate from system 30, or alternatively may be an internal component of system 30. Computer 84 includes computer-based hardware, such as data storage devices, processors, memory modules and the like for generating and storing tool path and related printing instructions. Computer 84 may transmit these instructions to system 30 (e.g., to controller 80) to perform printing operations.

During operation, controller 80 may direct print head 40 to selectively draw successive segments of the part and support material filaments from consumable assemblies 44 and 46 (via guide tubes 70 and 72). Print head 40 thermally melts the successive segments of the received filaments such that they become molten flowable materials. The molten flowable materials are then extruded and deposited from print head 40, along the printing z-axis axis, onto receiving surface 36a for printing 3D part 50 (from the part material), support structure 52 (from the support material), and scaffold 54 (from the part and/or support materials).

Print head 40 may initially print one or more layers of support structure 52 onto receiving surface 36a to provide an adhesive base for the subsequent printing. This maintains good adhesion between the layers of 3D part 50 and platen 36, and reduces or eliminates any tolerance to flatness between receiving surface 36a of platen 36 and the x-y plane. After each layer is printed, controller 80 may direct platen gantry 38 to index platen 36 along the z-axis in the direction of arrow 86 by a single layer increment.

After support structure 52 is initially printed, print head 40 may then print layers of 3D part 50 and scaffold 54, and optionally any additional layers of support structure 52. As discussed above, the layers of support structure 52 are intended to support the bottom surfaces of 3D part 50 along the printing z-axis against curl forces, and the layers of scaffold 54 are intended to brace 3D part 50 against gravity along the vertical x-axis.

Figure 3:
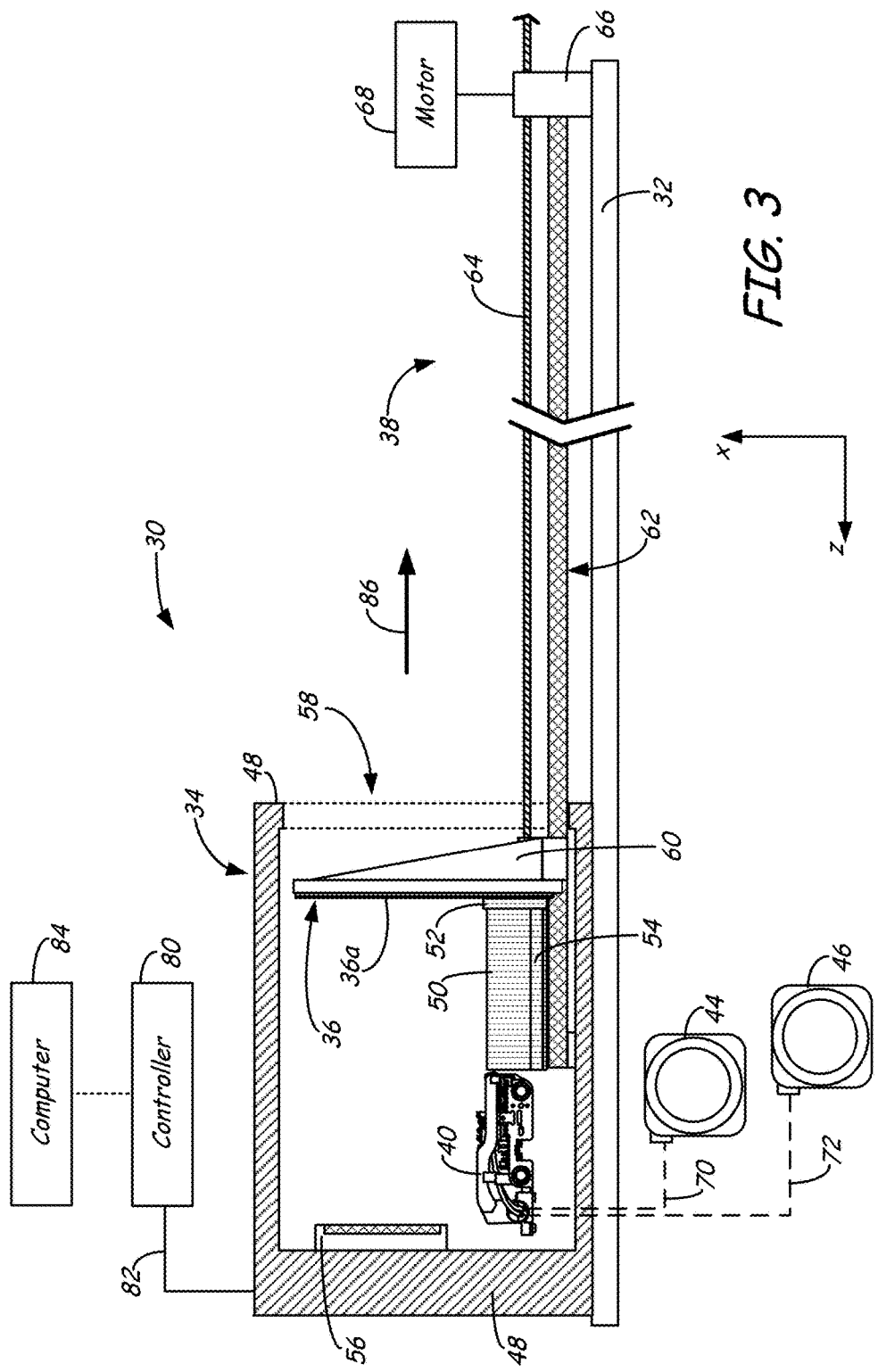
FIG. 3 is a side view of the first example system.

As shown in FIG. 3, guide rails 62 are illustrated with cross hatching and head gantry 42 is omitted for ease of viewability. As the printed 3D part 50 and scaffold 54 grow along the z-axis, the indexing of platen 36 in the direction of arrow 86 moves platen 36 through chamber 34 towards port 58. Port 58 desirably has dimensions that allow platen 36 to pass through without contacting chamber walls 48. In particular, port 58 is desirably parallel (or substantially parallel) to platen 36 (i.e., both extend in the x-y plane), with dimensions that are slightly larger than the cross-sectional area of platen 36. This allows platen 36 (and the growing 3D part 50 and scaffold 54) to pass through port 58 without interference, while also desirably reducing thermal loss through port 58.

As the printed layers of 3D part 50, support structure 52, and scaffold 54 move in the direction of arrow 86 through chamber 34 toward port 58, the temperature of chamber 34 gradually cools them down from their respective extrusion temperatures to the temperature in chamber 34. As mentioned above, this reduces the risk of distortions and curling. Gantry assembly 38 desirably indexes platen 36 at a rate that is slow enough such that the printed layers cool down to the temperature(s) of chamber 34, and reside in chamber 34 for a duration that is sufficient to substantially relieve cooling stresses, prior to reaching port 58. This allows the printed layers to be relaxed enough such that when they reach the temperature gradient at port 58, the temperature drop at the temperature gradient does not cause any substantial distortions or curling.

Figure 4B:
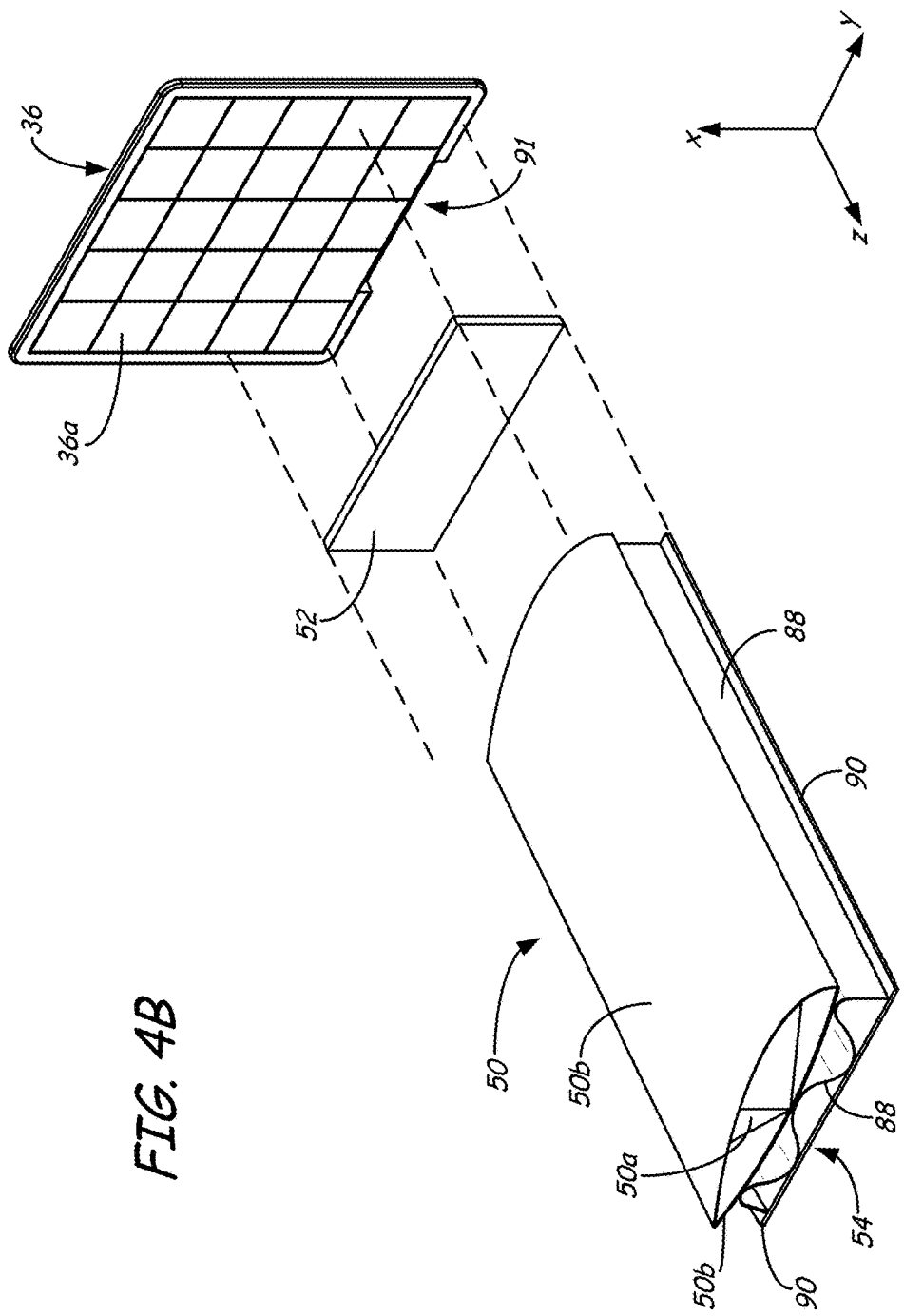
FIG. 4B is an exploded perspective view of the 3D part, support structure, and scaffold printed on the platen.

FIGS. 4A and 4B illustrate 3D part 50, support structure 52, scaffold 54, and platen 36 during the printing operation. 3D part 50 includes interior structure 50a and exterior surfaces 50b, where interior frame 50a functions in the same manner as scaffold 54 for laterally bracing the exterior surfaces 50b of 3D part 50. In alternative embodiments, depending on the geometry of 3D part 50, interior structure 50a may be omitted or may be printed from a support material that can be subsequently removed from 3D part 50 (e.g., a soluble support material). In embodiments in which interior structure 50a is printed from a soluble support material, interior frame 50a is desirably porous and/or sparse to increase the flow of a dissolving fluid (e.g., an alkaline aqueous solution) through the interior region of 3D part 50. This can increase the dissolution rate of interior structure 50a.

In the shown example, scaffold 54 includes ribbon portion 88 and conveyor base 90. Further details of this ribbon-base arrangement for scaffold 54 are discussed below. Briefly, ribbon portion 88 is connected to exterior surface 50b of 3D part 50 with small contact points to brace 3D part 50 against sagging due to gravity. The small contact points allows ribbon portion 88 to be readily broken apart or otherwise removed from 3D part 50 after the printing operation is completed. Conveyor base 90 is a planar sheet that supports ribbon portion 88, providing a smooth surface that can rest on and slide over guide rails 62 as platen 36 is indexed along the z-axis.

As further shown in FIGS. 4A and 4B, support structure 30 is desirably printed on receiving surface 36a to at least encompass the footprint area of 3D part 50 and scaffold 54 (i.e., the cross-sectional area of 3D part 50 and scaffold 54 in the x-y plane). In the shown example, support structure 30 only covers about the bottom 40% of platen 36. However, for 3D parts and scaffolds having larger geometries in the x-y plane, the entire surface of platen 36 may be used, allowing 3D parts having cross-sectional areas up to about the cross-sectional area of platen 36 to be printed. Furthermore, the lengths of the 3D parts are limited only by the length of platen gantry 38. Thus, system 30 is suitable for printing long 3D parts, having a variety of different cross-sectional geometries, such as airfoils, manifolds, fuselages, and the like.

As shown in FIG. 4B, platen 36 includes base indentation 91, which 91 is configured to align with the top surface of guide rails 62. This arrangement allows support structure 52 and conveyor base 90 of scaffold 54 to be printed flush against indentation 91. This allows support structure 52 and scaffold 54 to rest on and slide across the top surface of guide rails 62 while platen 36 is indexed in the direction of arrow 86.

Figure 5:
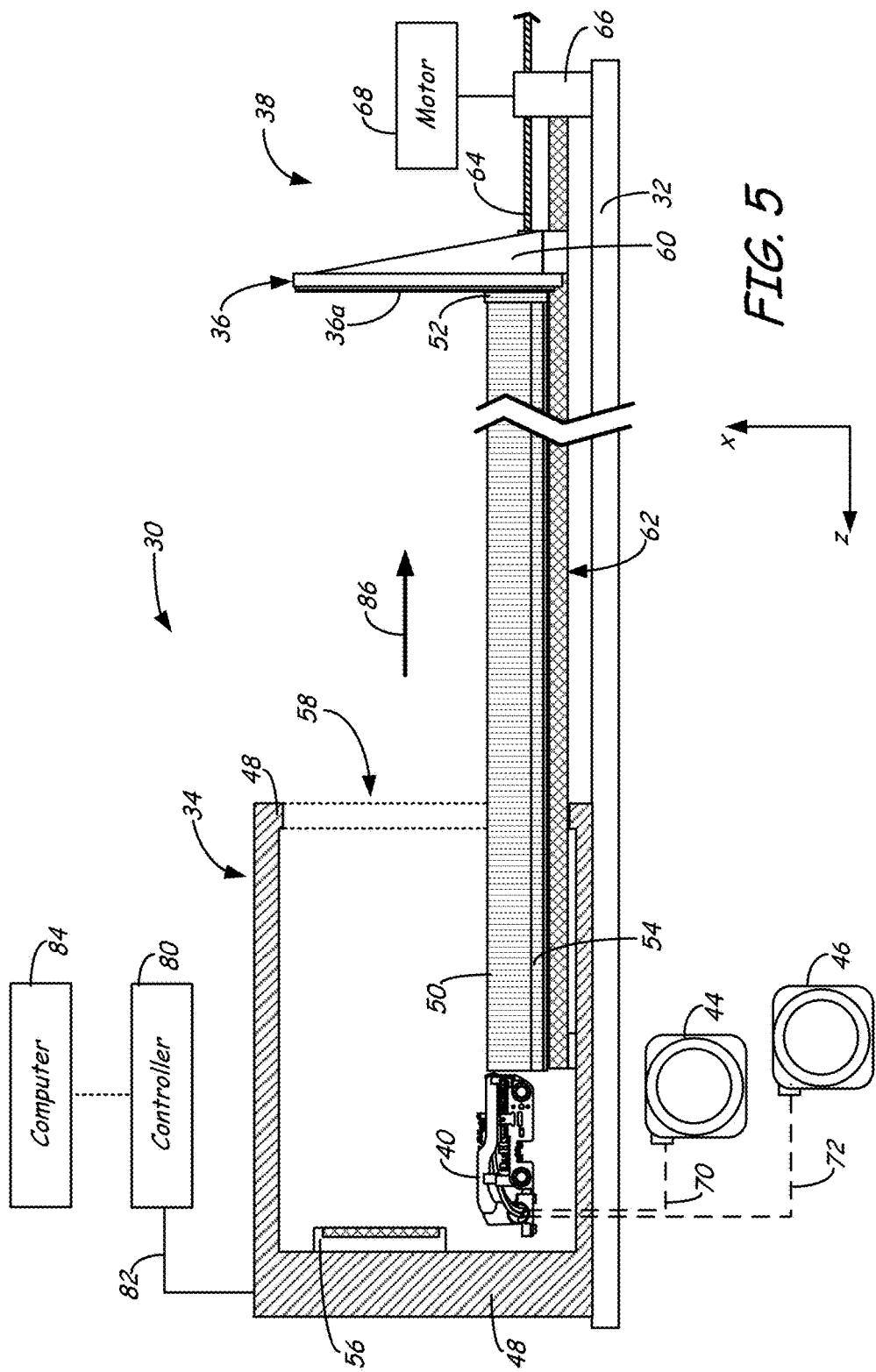
FIG. 5 is a side view of the first example system, illustrating the 3D part being printed horizontally.

As shown in FIG. 5, as platen gantry 38 continues to index platen 36 in the direction of arrow 86, the successive layers of 3D part 50 and scaffold 54 pass through the thermal gradient at port 58 and move outside of chamber 34. As discussed above, the printed layers desirably cool down to the temperature(s) of chamber 34 prior to reaching port 58 to reduce the risk of distortions and curling. Upon passing through port 58, the printed layers may then cool down to the ambient temperature outside of chamber 34 (e.g., room temperature).

The printing operation may continue until the last layer of 3D part 50 is printed and/or when platen 36 is fully indexed to the end of platen gantry 38. As can appreciated, allowing platen 36 to move out of chamber 34 increases the lengths of 3D parts that may be printed by system 30 compared to additive manufacturing systems having enclosed chambers.

After the printing operation is completed, the printed 3D part 50, support structure 52, scaffold 54, and platen 36 may be removed from system 30 (e.g., by disengaging platen 36 from platen gantry 38). Platen 36 may then be removed from support structure 30, and support structure 30 may be removed from 3D part 50 and scaffold 54 (e.g., by dissolving support structure 30). Scaffold 54 may then be broken apart from or otherwise removed from 3D part 50.

While system 30 is particularly suitable for printing 3D parts that are long along the z-axis (e.g., 3D part 50), system 30 may also print 3D parts that are shorter along the z-axis. In instances where 3D part 50 is short along the z-axis, such that the adhesiveness of support structure 52 is sufficient to support the 3D part in a cantilevered manner without substantial sagging, scaffold 54 may be omitted. However, as can be appreciated, as the length of a 3D part grows along the z-axis, support structure 52 alone is not sufficient to prevent remotely-printed layers of the 3D part from sagging under gravity. In this situation, one or more scaffolds (e.g., scaffold 54) may be printed along with the 3D part to laterally brace the 3D part.

Figure 6:
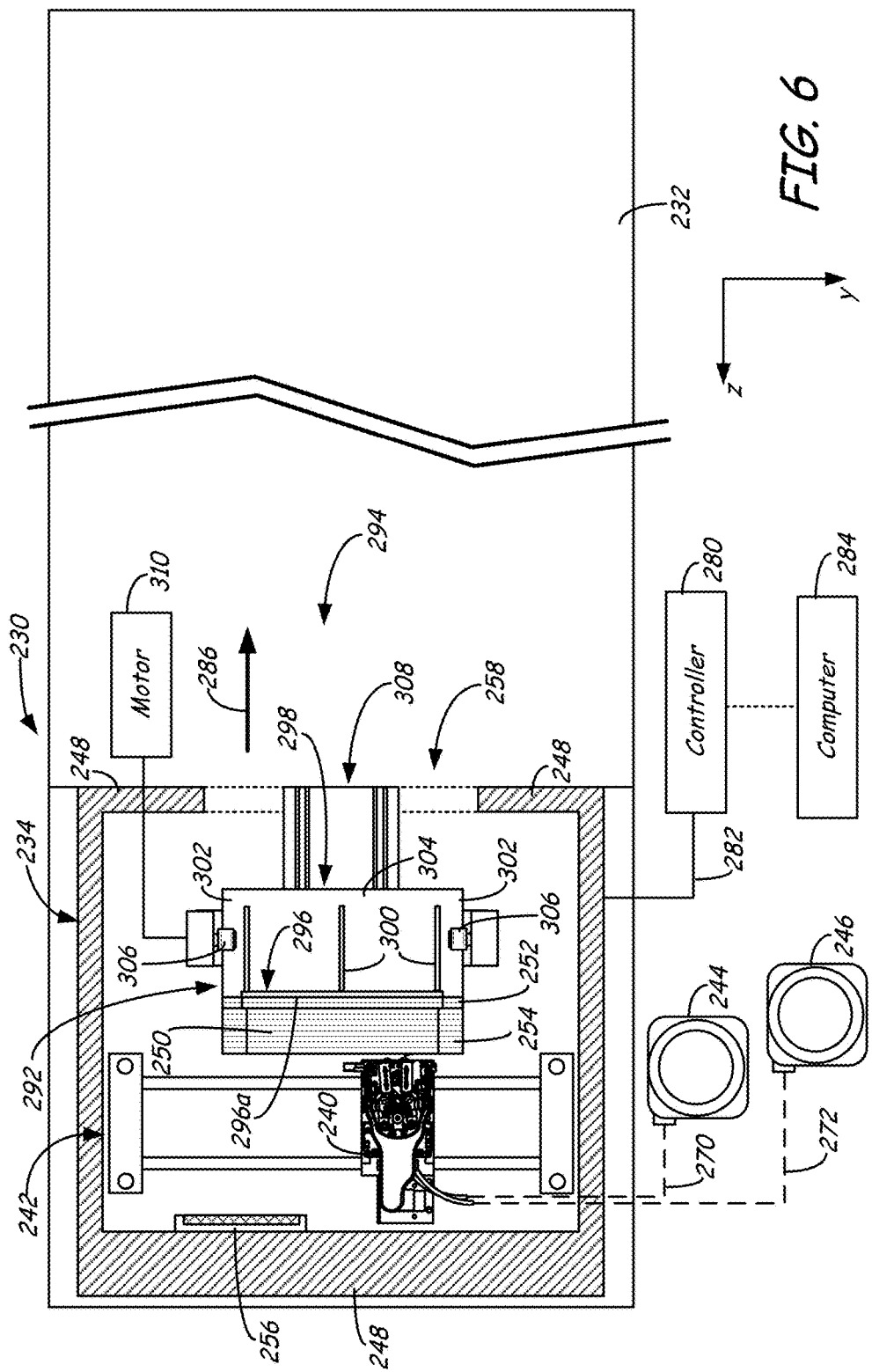
FIG. 6 is a top view of a second example additive manufacturing system of the present disclosure having a platen starter piece for printing a 3D part horizontally.

FIGS. 6-9 show system 230, which is a second example additive manufacturing system having a platen starter piece and associated drive mechanism. As shown in FIG. 6, system 230 may operate in a similar manner to system 30 (shown in FIGS. 2-5), where the reference numbers for the respective features are increased by "200". In this embodiment, platen 36 and platen gantry 38 of system 30 are replaced with a platen starter piece 292 and drive mechanism 294.

Starter piece 292 is a removable print foundation having platen portion 296, platform portion 298, and reinforcing arms 300 (best shown in FIG. 8B). Platen portion 296 includes receiving surface 296a for receiving the printed support structure 252 in the same manner as receiving surface 36a of platen 36. Platform portion 298 includes edge segments 302 and central segment 304, where edge segments 302 are offset across from each other along the y-axis. Platen portion 296 is integrally formed with or otherwise connected to platform portion 298 at central segment 304, and does not extend laterally to edge segments 302. As such, platen portion 296 extends parallel to the x-y plane, and at a right angle to platform portion 298, which extends in the y-z plane. Reinforcing arms 300 are optional components that structurally reinforce platen portion 296.

Starter piece 292 may be fabricated from one or more polymeric and/or metallic materials. For example, starter piece 292 may be molded (e.g., injection molded) or printed with an additive manufacturing system from a polymeric material to provide a rigid piece capable of supporting the printed layers of 3D part 250, support structure 252, and scaffold 254. In an alternative embodiment, platform portion 298 may be a web-based film with platen portion 296 secured thereon.

Figure 7:
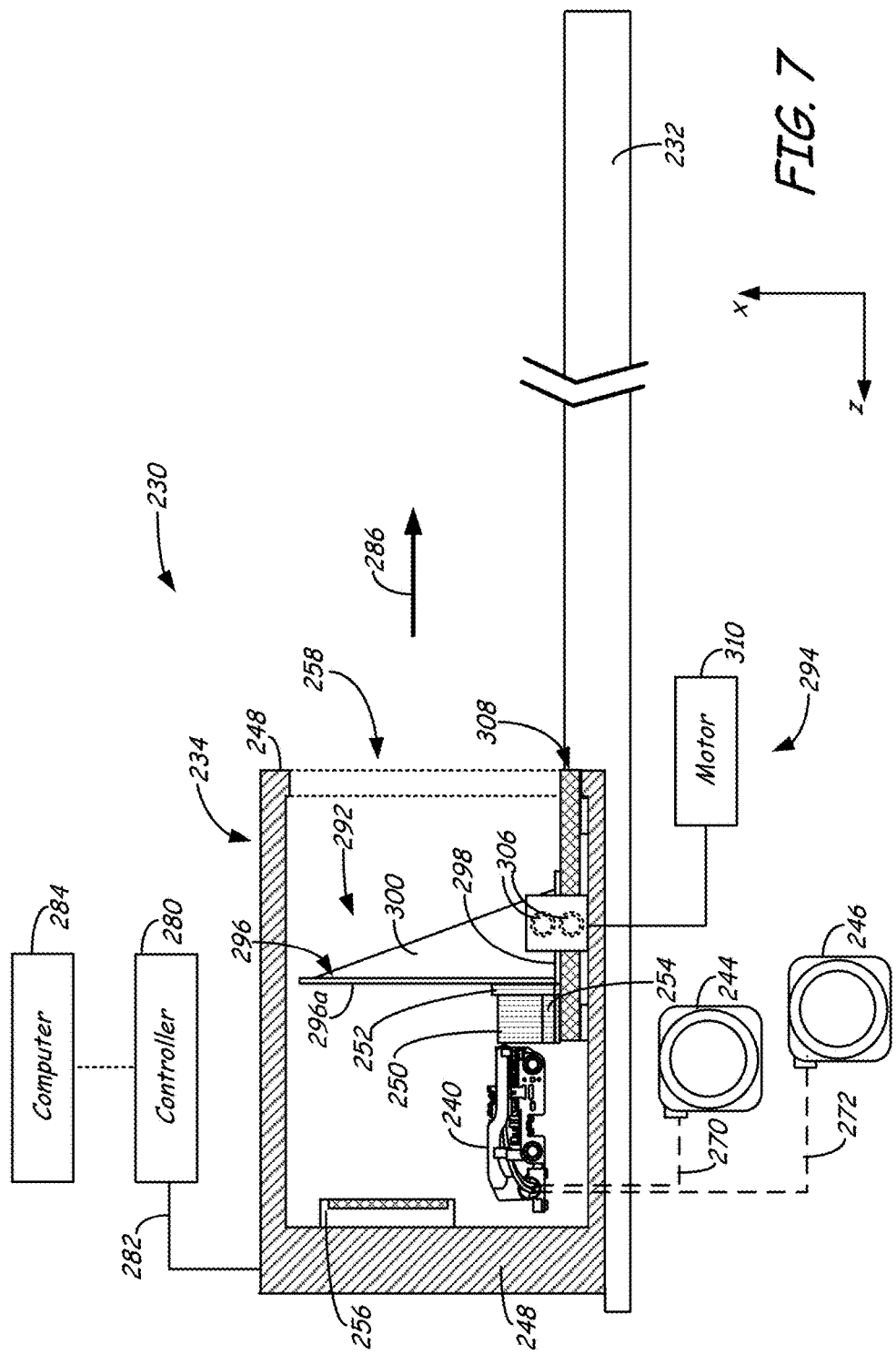
FIG. 7 is a side view of the second example system.

As shown in FIGS. 6 and 7, drive mechanism 294 is a wheel-based drive mechanism that includes two pairs of drive wheels 306, guide rails 308, and motor 310, where, in FIG. 7, guide rails 308 are illustrated with cross hatching (and head gantry 242 is omitted) for ease of viewability. Prior to the printing operation, platform portion 298 of starter piece 292 may be inserted between the pairs of drive wheels 306. Platform portion 298 may also include one or more alignment tabs 312 (best shown in FIG. 8B) to align and slidably couple starter piece 292 to guide rails 308.

Guide rails 308 function as linear bearings along the horizontal z-axis in a similar manner to guide rails 62 (shown in FIGS. 2, 3, and 5). However, guide rails 308 may be considerably shorter in length compared to guide rails 62, thereby reducing the size of system 10 on table 232. For example, guide rails 308 may be retained entirely within chamber 234.

During operation, print head 240 initially prints one or more layers of support structure 252 onto receiving surface 296a to provide an adhesive base for the subsequent printing. This maintains good adhesion between the layers of 3D part 250 and receiving surface 296a. However, as best shown in FIGS. 8A and 8B, the layers of support structure 252 also include edge segments 314 corresponding to edge segments 302 of starter piece 292, and alignment tabs 316 (shown in FIG. 8B) corresponding to alignment tabs 312 of starter piece 292.

After each layer of support structure 252 is printed, drive mechanism 294 may index starter piece 292 along the z-axis in the direction of arrow 286 by a single layer increment. In particular, as shown in FIG. 8A, each pair of drive wheels 306 may engage the opposing surfaces of one of the edge segments 302. Drive wheels 306 are operated by motor 310, which rotates drive wheels 306 to index starter piece 292 along the z-axis in the direction of arrow 286.

In alternative embodiments, drive mechanism 294 may be replaced with a variety of different drive mechanisms for engage with and moving starter piece 292, support structure 252, and scaffold 254 in the same manner. For example, drive wheels 306 may be replaced with cogs, textured wheels, spiked wheels, textured and/or tacky conveyor belts, and the like to engage one side of each edge segment 302, both sides of each edge segment 302, or combinations thereof.

After support structure 252 is printed, print head 240 may then print layers of 3D part 250 and scaffold 254, and optionally any additional layers of support structure 252. As further shown in FIGS. 8A and 8B, conveyor base 288 of scaffold 254 is printed to include edge segments 318 corresponding to edge segments 302 and 314, and alignment tabs 320 corresponding to alignment tabs 312 and 316. In alternative embodiments, alignment tabs 312, 316, and/or 320 may be omitted. In these embodiments, system 230 may include other suitable features (e.g., alignment pins) to maintain registration in the x-y plane.

As drive wheels 306 continue to index starter piece 292 in the direction of arrow 286, alignment tabs 316 of support structure 252 and alignment tabs 320 of scaffold 254 eventually reach and slidably couple with guide rails 308 to maintain proper registration in the x-y plane. Furthermore, as illustrated by arrow 322 in FIG. 8A, drive wheels 306 eventually pass edge segments 302 of starter piece 292, and engage edge segments 314 and 318 to continue to index support structure 250 and scaffold 254 in the direction of arrow 286. In some embodiments, system 230 may include one or more sensors (not shown) to provide feedback to controller 280, thereby maintaining proper indexing of scaffold 250. For example, system 230 may include one or more optical sensors to measure displacement of scaffold 250 along the z-axis, which may transmit signals to controller 280 to provide accurate an indexing of scaffold 250.

As can be appreciated, because drive wheels 306 engage scaffold 254 at both sides of edge segment 318 of scaffold 254, the opposing drive wheels 306 may need to be adjusted along the y-axis to compensate for the dimensions of 3D part 250. For instance, if 3D part 250 is very wide along the y-axis, the opposing pairs of drive wheels 306 may need to be separated further apart along the y-axis (as illustrated by separation lines 321 in FIG. 8A) to accommodate the wider support structure 252 and scaffold 254. Alternatively, if 3D part 250 is very narrow along the y-axis, the opposing pairs of drive wheels 306 may need to be moved closer together along the y-axis to reduce the widths of support structure 252 and scaffold 254. This reduces the needed sizes of support structure 252 and scaffold 254. However, in one embodiment, drive wheels 306 may be maintained at a separation distance along the y-axis that accommodates the widest dimensions that can be printed by system 230. In this embodiment, support structure 252 and scaffold 254 may be printed with widths that reach drive wheels 306.

Figure 8C:
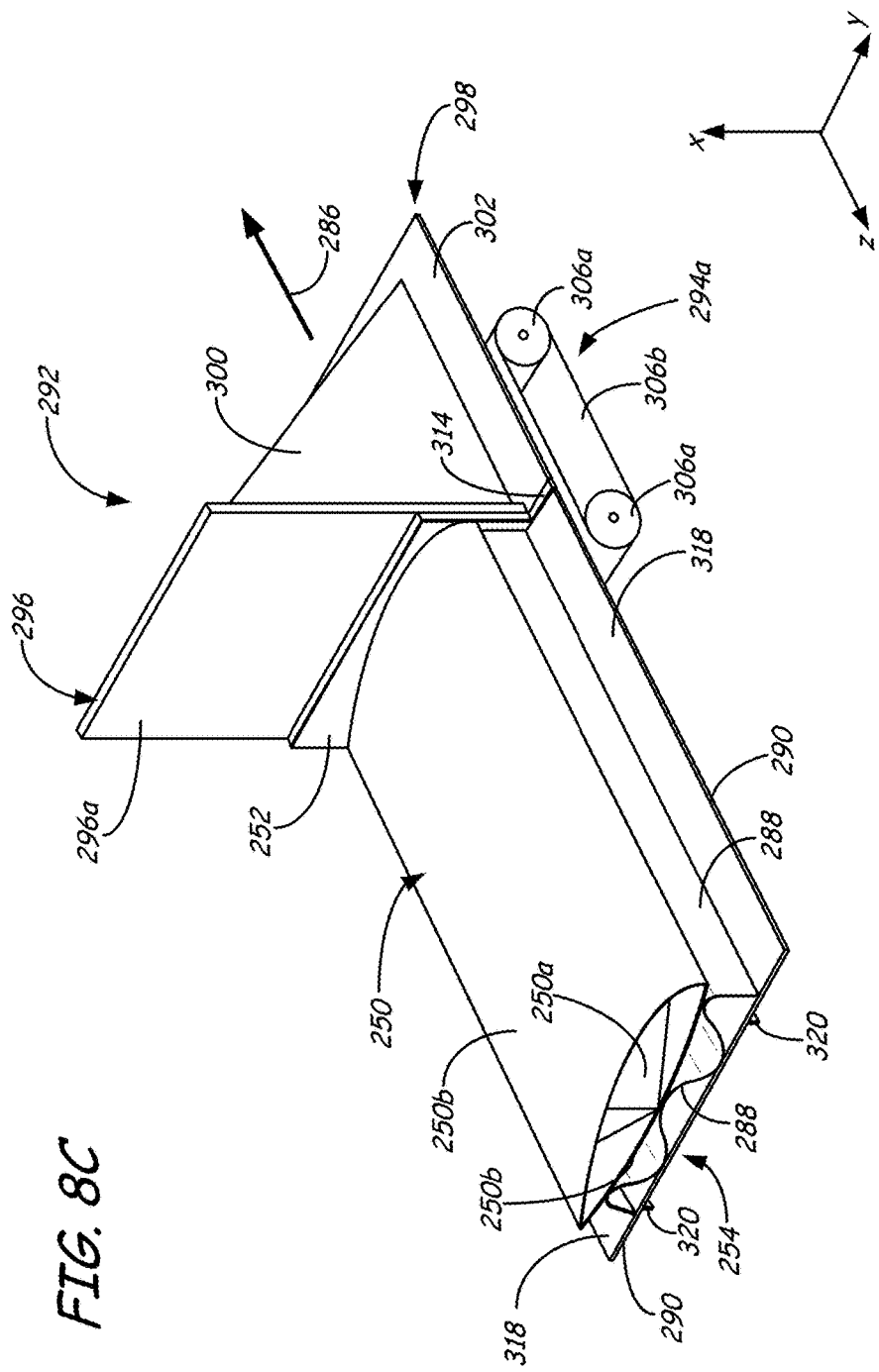
FIG. 8C is a perspective view of a 3D part, support structure, and scaffold printed on the platen starter piece, illustrating an alternative drive mechanism.

Alternatively, as shown in FIG. 8C, system 230 may include an alternative drive mechanism, such as drive mechanism 294a, that engages only the bottom surfaces of starter piece 292, support structure 252, and scaffold 254. As shown, drive mechanism 294a includes rollers 306a and drive belt 306b, where drive belt 306b engages the bottom surfaces of starter piece 292, support structure 252, and scaffold 254. The bottom surface engagement allows drive mechanism 294a to be used regardless of the dimensions of 3D part 250, support structure 52, and scaffold 254.

Drive belt 306b may engage with starter piece 292, support structure 252, and scaffold 254 with a variety of features, such a textured and/or tacky belt surface. This allows drive belt 306b to frictionally, mechanically, and/or adhesively grip the bottom surfaces of starter piece 292, support structure 252, and scaffold 254 to index or otherwise move them in the direction of arrow 286. The engagement between drive belt 306b and starter piece 292, support structure 252, and scaffold 254 may be based on the weights of starter piece 292, support structure 252, and scaffold 254, which hold them against drive belt 306b. Additionally, drive mechanism 230 may include additional components to assist in maintaining the engagement, such as with a magnetic coupling between starter piece 292 and drive mechanism 294. As can be further appreciated, while illustrated with a drive belt 306b, drive mechanism 294a may alternatively incorporate different features for engaging the bottom surfaces of starter piece 292, support structure 252, and scaffold 254 (e.g., drive wheels).

Figure 9:
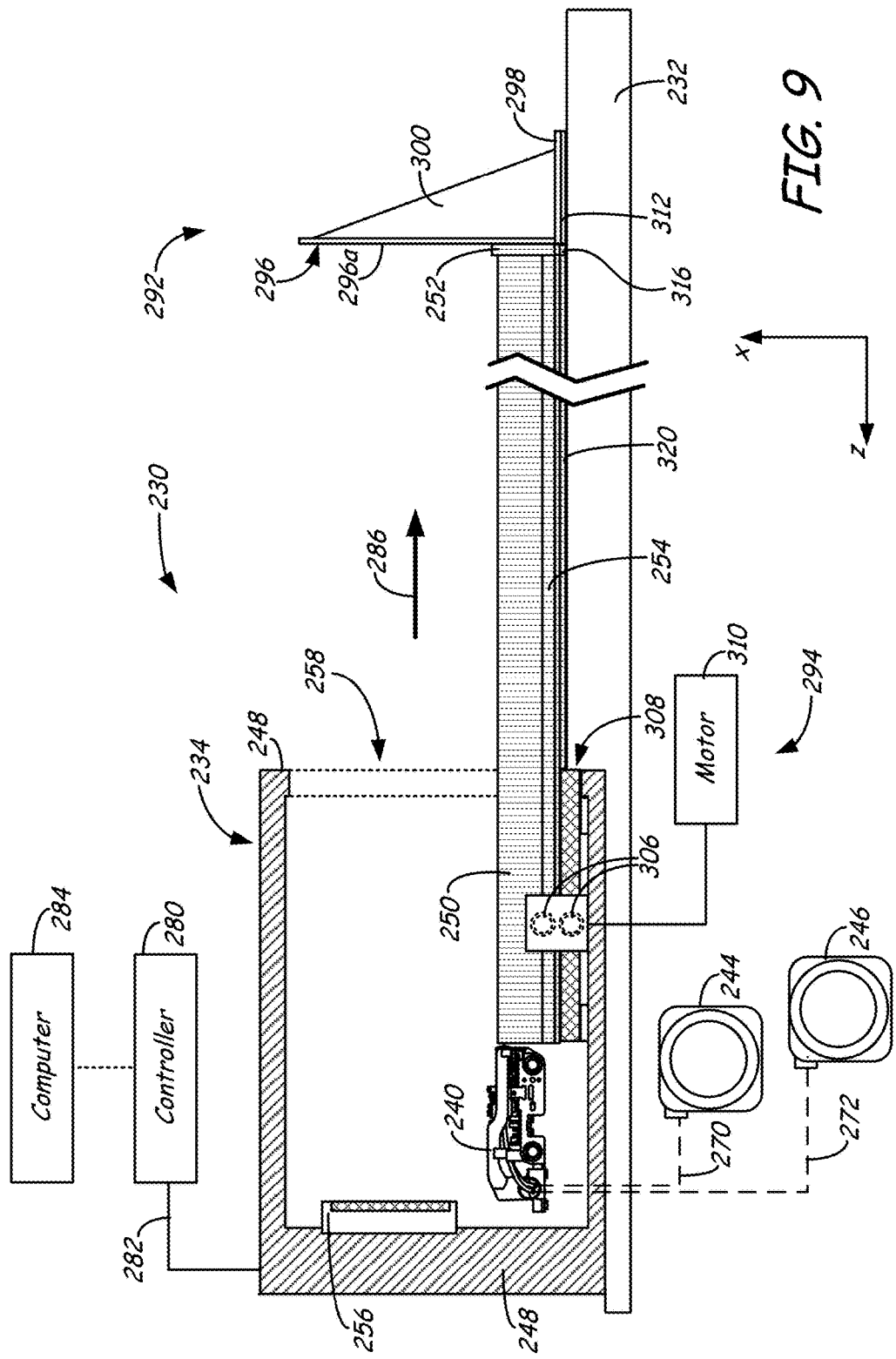
FIG. 9 is a side view of the second example system, illustrating the 3D part being printed horizontally.

As shown in FIG. 9, as drive mechanism 294 continues to index scaffold 254 in the direction of arrow 286, the successive layers of 3D part 250 and scaffold 254 pass through the thermal gradient at port 258 and move outside of chamber 234. In this embodiment, the table or surface 232 desirably steps up outside of chamber walls 248 to receive alignment tabs 312, 316, and 318, allowing them to slide across table 232 during the indexing. Furthermore, the stepped-up portion of table 232 may be treated or polished, may include low-friction material(s) (e.g., polytetrafluoroethylene), and/or may include air jets to form a cushion of air, thereby reducing the sliding friction with alignment tabs 312, 316, and 318. Alternatively, in embodiments in which alignment tabs 312, 316, and 318 are omitted, the stepped-up portion of table 232 may be flush with or slightly below the elevation of guide rails 308 to receive conveyor base 288 of scaffold 254.

Upon passing through port 258, the printed layers may then cool down to the ambient temperature outside of chamber 234 (e.g., room temperature). The printing operation may continue until the last layer of 3D part 250 is printed. As can be appreciated, by printing support structure 252 and scaffold 254 with edge segments 314 and 318 that are engagable by drive mechanism 294, system 230 effectively grows its own conveyor mechanism. The use of a conveyor-base scaffold in this manner allows guide rails 308 to be relatively short, and even remain within chamber walls 248. This reduces the overall size of system 230, and effectively allows 3D part 250 to be printed with an unbound length along the z-axis.

Figure 10:
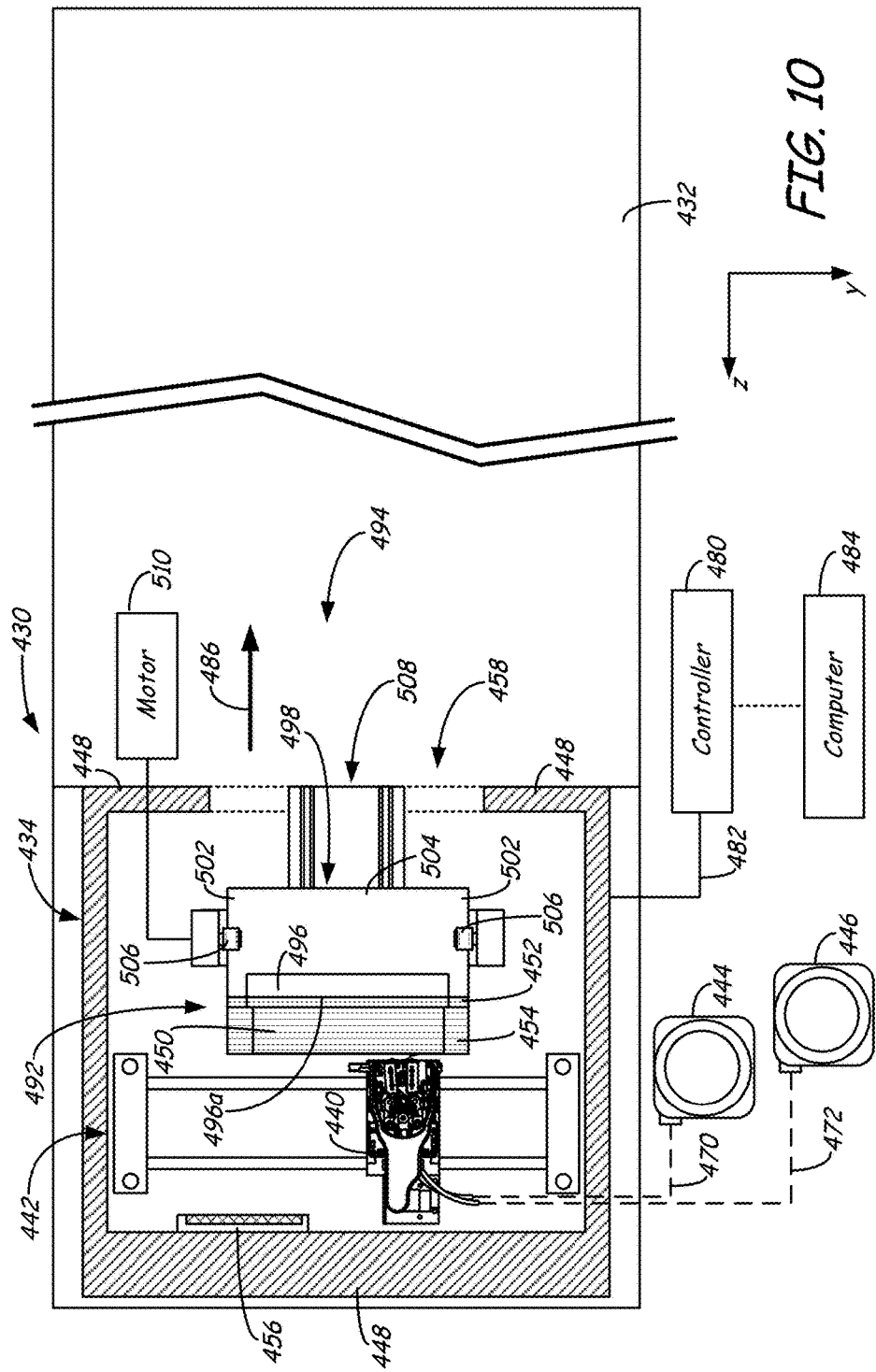
FIG. 10 is a top view of a third example additive manufacturing system of the present disclosure having a wedge starter piece for printing a 3D part horizontally.

FIGS. 10-14 show system 430, which is a third example additive manufacturing system having a wedge starter piece and associated drive mechanism. As shown in FIG. 10, system 430 may operate in a similar manner to system 230 (shown in FIGS. 6-9), where the reference numbers for the respective features are increased by "400" from those of system 30 (shown in FIGS. 2-5) and by "200" from those of system 230. In this embodiment, the platen starter piece 292 of system 230 is replaced with a wedge starter piece 492.

Starter piece 492 is a print foundation that is similar to starter piece 292, and includes wedge portion 496 (in lieu of platen portion 296) and platform portion 498. Wedge portion 496 has a sloped geometry that includes receiving surface 496a for receiving the printed layers of support structure 452. Platform portion 498 includes edge segments 502 and central segment 504, and functions in the same manner as platform portion 298 of start piece 292. Wedge portion 296 is integrally formed with or otherwise connected to platform portion 298 at central segment 504, and does not extend laterally to edge segments 502. As such, receiving surface 496a extends parallel to the x-y plane, and at a right angle to platform portion 498, which extends in the y-z plane.

Starter piece 292 (shown in FIGS. 6-9) and starter piece 492 illustrate example starter pieces of the present disclosure. Each starter piece of the present disclosure may include a platform portion and a receiving surface, where the particular geometry for structurally reinforcing the receiving surface relative to the platform portion may vary. In embodiments in which the receiving surface is small, no additional structural reinforcement is necessary, and the starter piece may have an "L"-shaped or block-shaped geometry. As the size of the receiving surface increases, one or more structural reinforcements (e.g., reinforcing arms 300 and the sloped geometry of wedge portion 496) may be desired to prevent the receiving surface from flexing or wobbling during printing operations.

As shown in FIGS. 10 and 11, drive mechanism 494 is a wheel-based drive mechanism that functions in the same manner as drive mechanism 294, and includes two pairs of drive wheels 506, guide rails 508, and motor 510, where, in FIG. 7, guide rails 308 are illustrated with cross hatching (and head gantry 242 is omitted) for ease of viewability. Prior to the printing operation, platform portion 498 of starter piece 492 may be inserted between the pairs of drive wheels 506. Print head 440 may then initially print one or more layers of support structure 452 onto receiving surface 496a, where the sloped geometry of wedge portion 496 reinforces receiving surface 496a.

However, as shown in FIG. 12, receiving surface 496a of wedge portion 496 has a small cross-sectional area compared to receiving surfaces 36a and 296a, and is also smaller than the combined footprint areas of 3D part 450 and scaffold 454. As such, in this embodiment, support structure 452 may grow with an increasing cross-sectional area in the x-y plane. This may be accomplished by printing the successive layers of support structure 452 with increasing cross-sectional areas in the x-y plane. For example, the successive layers of support structure 452 may be printed with an angle of increasing size (e.g., angle 526) up to about 45 degrees in any direction from the z-axis without requiring support from the previous layers.

Figure 13A:
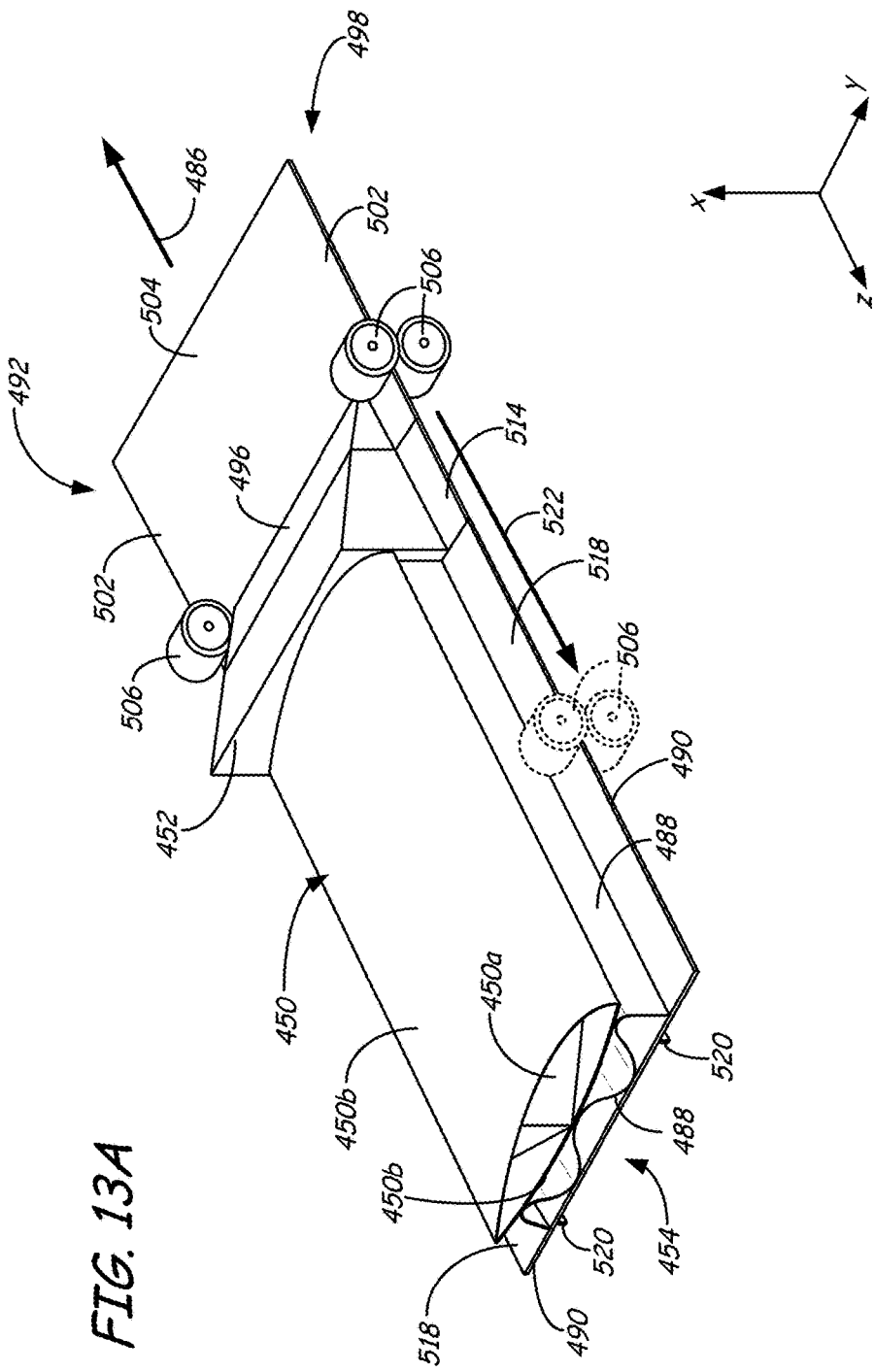
FIG. 13A is a perspective view of a 3D part, support structure, and scaffold printed on the wedge starter piece.
Figure 13B:
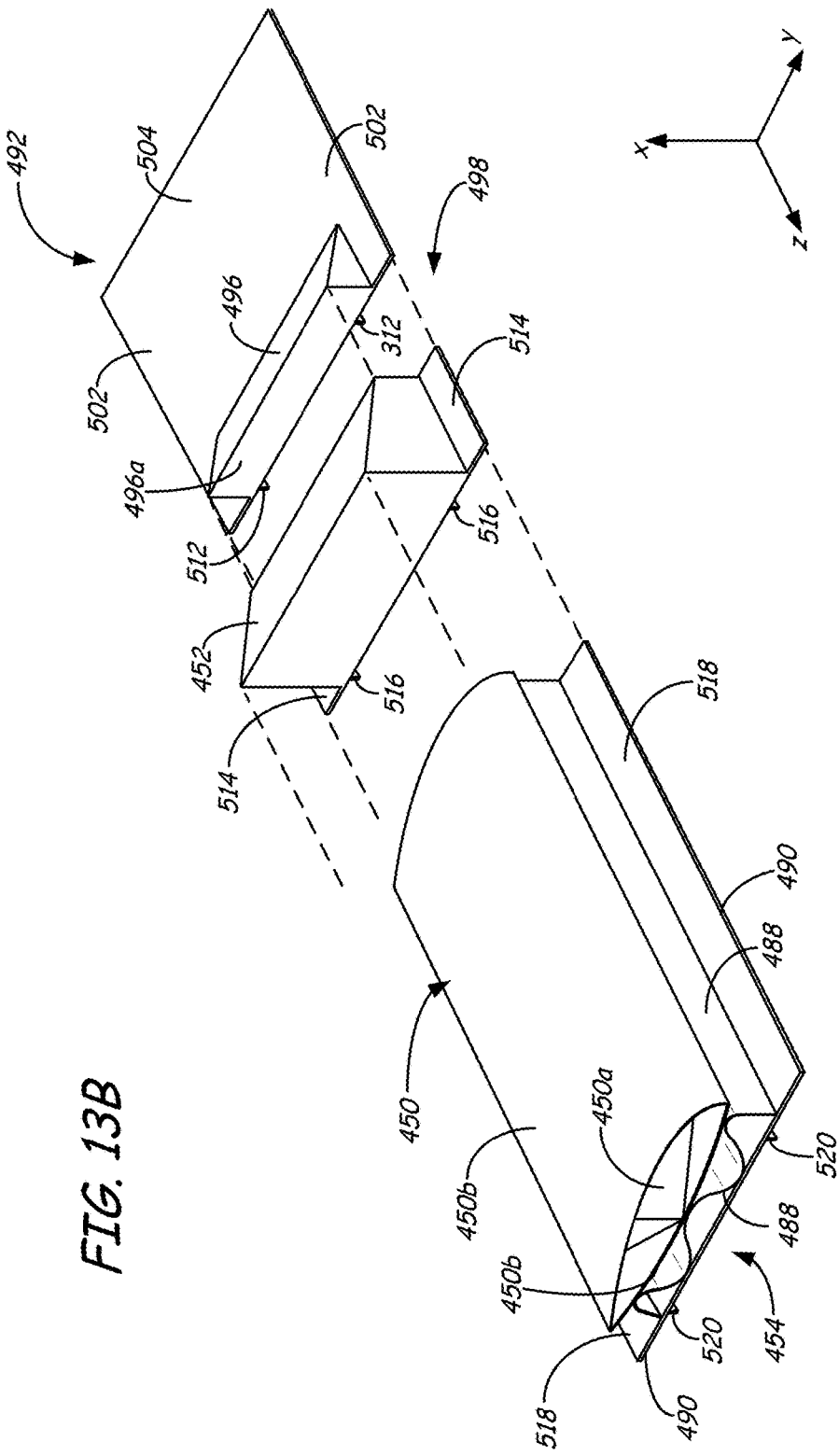
FIG. 13B is an exploded perspective view of the 3D part, support structure, and scaffold printed on the wedge starter piece.

Support structure 452 may grow with an increasing cross-sectional area at least until it encompasses the footprint area of 3D part 450 and scaffold 454 (i.e., the cross-sectional area of 3D part 450 and scaffold 454 in the x-y build plane). Additionally, as best shown in FIGS. 13A and 13B, the layers of support structure 452 may be printed to include edge segments 514 corresponding to edge segments 502 of starter piece 492, and alignment tabs 516 (shown in FIG. 13B) corresponding to alignment tabs 512 of starter piece 492.

After each layer of support structure 452 is printed, drive mechanism 494 may index starter piece 492 along the z-axis in the direction of arrow 286 by a single layer increment in the same manner as discussed above for starter piece 292 and drive mechanism 294. Thus, the last printed layer of support structure 452 functions as a print foundation receiving surface for 3D part 450 and scaffold 454. Print head 440 may then print layers of 3D part 450 and scaffold 454, and optionally any additional layers of support structure 452. As further shown in FIGS. 13A and 13B, conveyor base 488 of scaffold 454 is printed to include edge segments 518 corresponding to edge segments 502 and 514, and alignment tabs 520 corresponding to alignment tabs 512 and 516.

As drive wheels 506 continue to index starter piece 492 in the direction of arrow 486, alignment tabs 516 of support structure 452 and alignment tabs 520 of scaffold 454 eventually reach and slidably couple with guide rails 508 to maintain proper registration in the x-y plane. Furthermore, as illustrated by arrow 522 in FIG. 13A, drive wheels 506 eventually pass edge segments 502 of starter piece 492, and engage edge segments 514 and 518 to continue to index support structure 450 and scaffold 454 in the direction of arrow 486.

Figure 14:
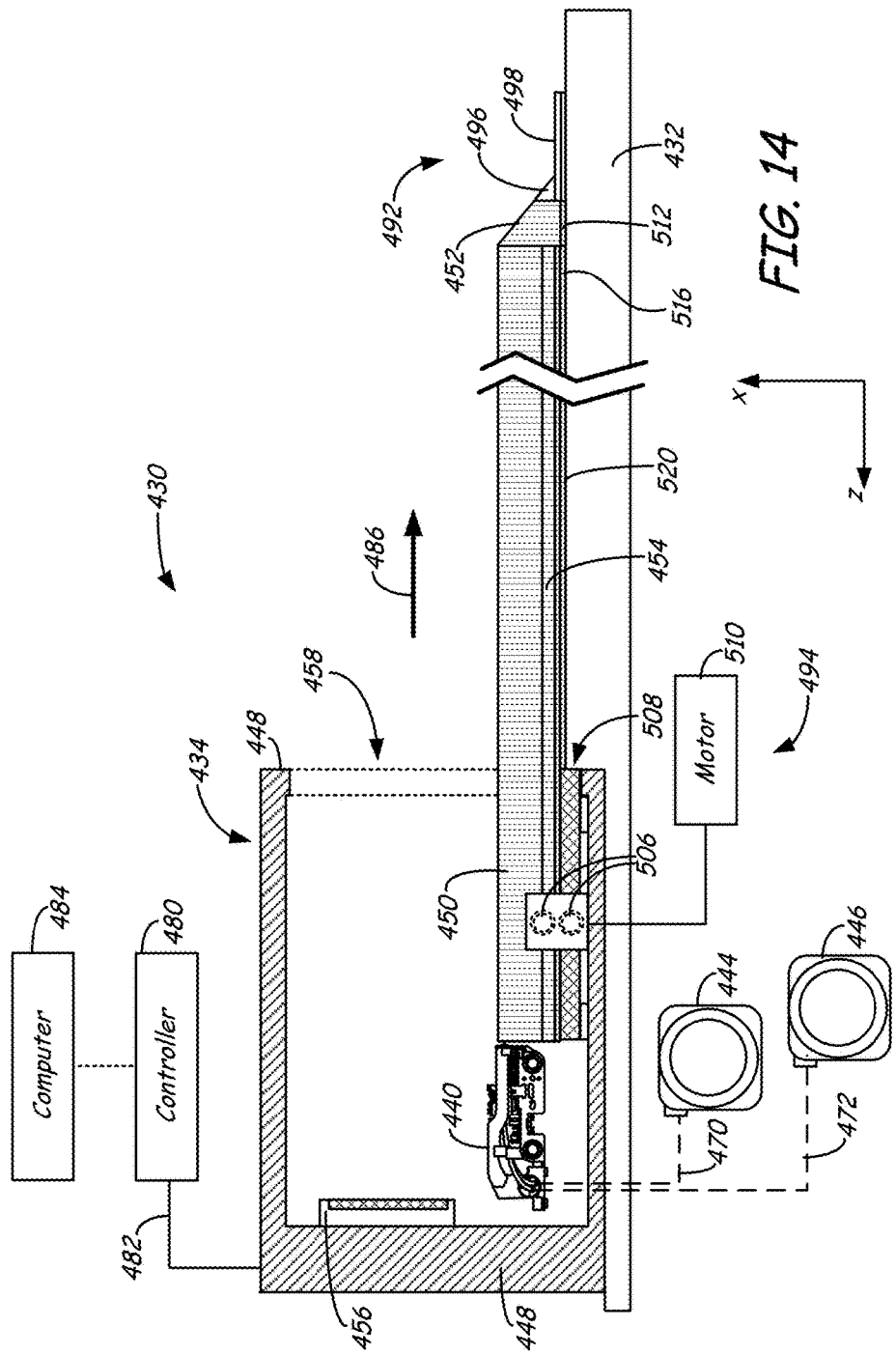
FIG. 14 is a side view of the third example system, illustrating the 3D part being printed horizontally.

As shown in FIG. 14, as drive mechanism 494 continues to index scaffold 454 in the direction of arrow 486, the successive layers of 3D part 450 and scaffold 454 to pass through the thermal gradient at port 458 and move outside of chamber 434. Upon passing through port 458, the printed layers may then cool down to the ambient temperature outside of chamber 434 (e.g., room temperature).

The printing operation may continue until the last layer of 3D part 450 is printed, or, as discussed below, additional 3D parts may be printed with the use of scaffold 454, where portions of scaffold 454 may function as print foundation receiving surfaces for the additional 3D parts. The use of starter piece 492 achieves the same benefits as the use of starter piece 292 by reducing the overall size of system 430, and allowing 3D part 450 to be printed with an unbound length along the z-axis. In addition, wedge portion 496 reduces the size and weight of starter piece 492 relative to starter piece 292, and allows the last layer of support structure 452 to function as a print foundation receiving surface for 3D part 450 and scaffold 454.

Vertical Printing

Figure 15:
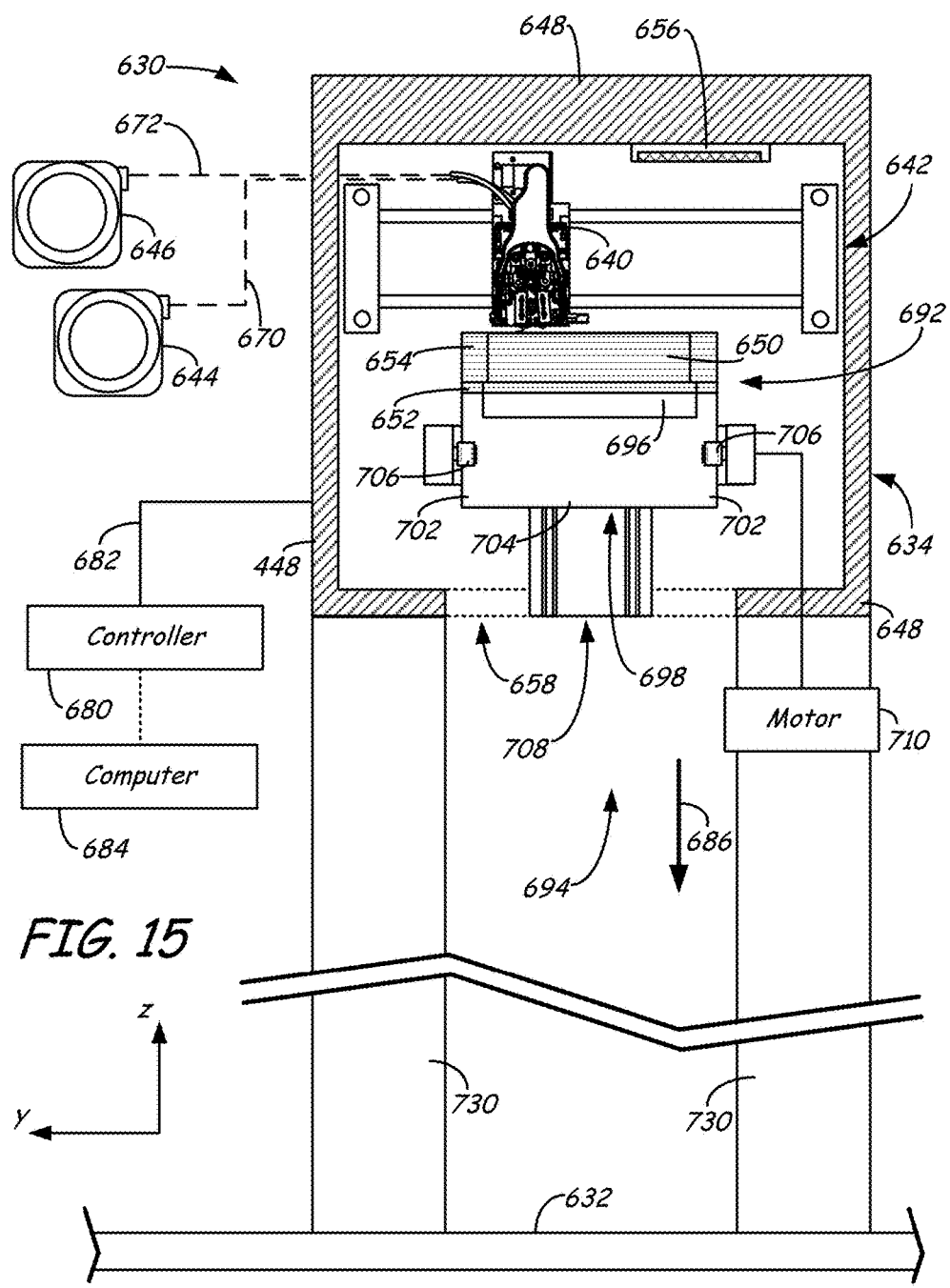
FIG. 15 is a side view of a fourth example additive manufacturing system of the present disclosure having a wedge starter piece for printing a 3D part vertically.
Figure 16:
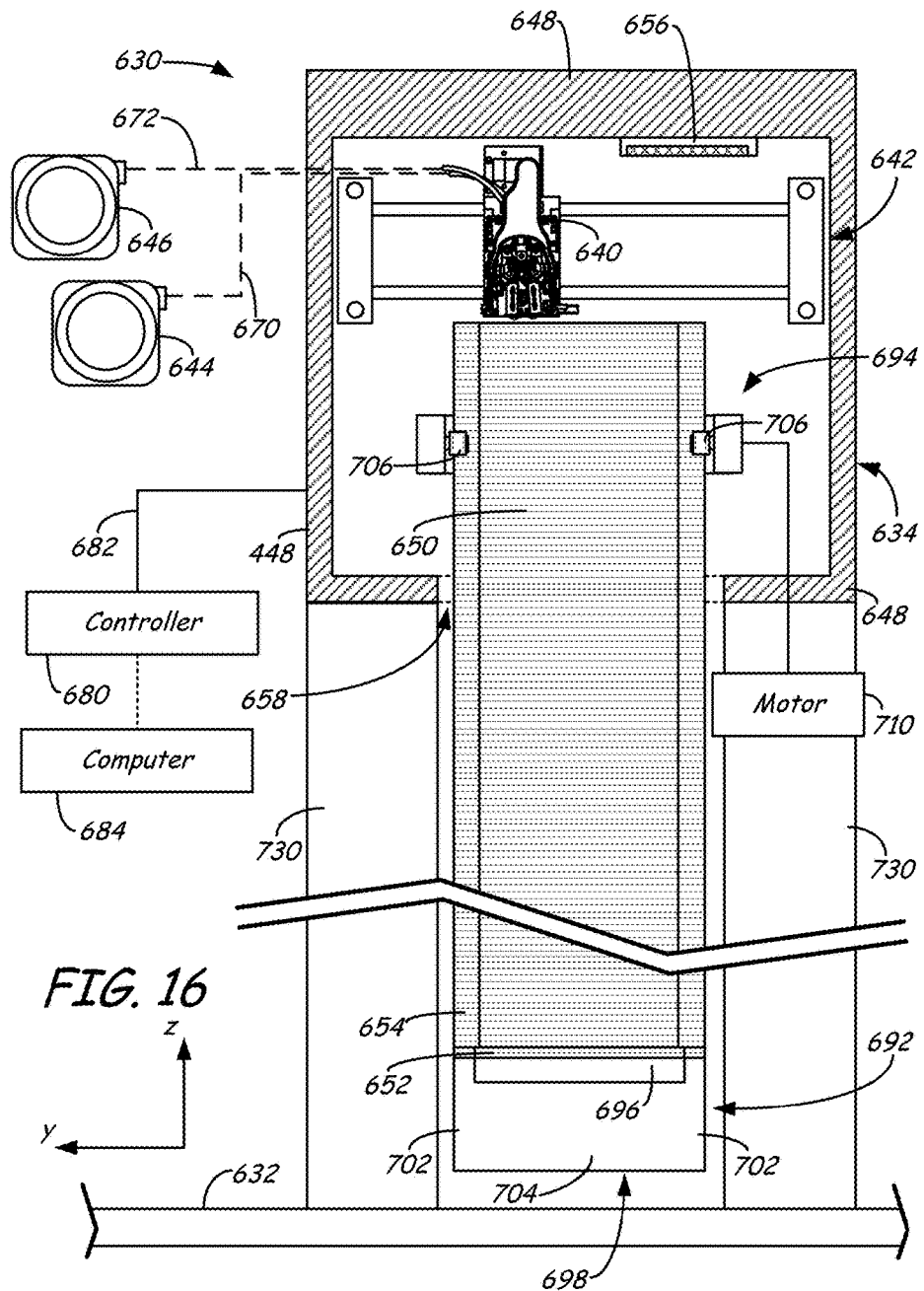
FIG. 16 is a side view of the fourth example system, illustrating the 3D part being printed vertically.

FIGS. 15 and 16 illustrate system 630, which is an example additive manufacturing system of the present disclosure having an extended printing volume for printing tall 3D parts vertically, such as discussed above for 3D part 10 (shown in FIG. 1A). As shown in FIG. 15, system 630 may operate in a similar manner to system 430 (shown in FIGS. 10-14), where the reference numbers for the respective features are increased by "600" from those of system 30 (shown in FIGS. 2-5), by "400" from those of system 230 (shown in FIGS. 6-9), and by "200" from those of system 430.

In the shown embodiment, system 630 may be supported on legs or other suitable extensions 730 above a floor or other suitable surface 632. Port 658 extends through a bottom chamber wall 648 and is substantially parallel to the x-y plane. Accordingly, system 630 is configured to print 3D part 650, support structure 652, and scaffold 654 along a printing z-axis that is a vertical axis, where starter piece 692 may be indexed downward along the z-axis in the direction of arrow 686.

As drive mechanism 694 continues to index starter piece 692, support structure 652, and scaffold 654 downward in the direction of arrow 686, the successive layers of 3D part 650, support structure 652, and scaffold 654 pass through the thermal gradient at port 658, and move outside of chamber 634. Upon passing through port 658, the printed layers may then cool down to the ambient temperature outside of chamber 634 (e.g., room temperature). The printing operation may continue until the last layer of 3D part 650 is printed, or and/or when starter piece 692 is fully indexed to surface 632. As can appreciated, allowing 3D part 650 to move downward out of chamber 634 increases the height that may be printed by system 630 compared to additive manufacturing systems having enclosed chambers.

As discussed above for scaffolds 18a and 18b (shown in FIG. 1A), scaffold 654 may be printed to brace the lateral sides of 3D part 650. As shown in FIG. 16, this allows drive mechanism 694 to index scaffold 654 downward. Additionally, scaffold 654 may reduce or prevent wobbling that may occur while 3D part 650 is printed, thereby substantially maintaining proper registration between 3D part 650 and print head 640.

While described with a wedge starter piece 692 and wheel-based drive mechanism 694, system 630 may alternatively be used with a variety of different print foundations and drive mechanisms, such as a platen and platen gantry (e.g., platen 36 and platen gantry 38) and a platen starter piece (e.g., starter piece 292), which may be used in the same manners as discussed above for systems 30 and 230. In these embodiments, scaffold 654 may continue to be used to reduce wobbling by laterally bracing 3D part 650.

Multiple Chambers

The above-discussed embodiments for the additive manufacturing systems of the present disclosure may be referred to as single-chamber systems that provide two temperature zones (i.e., inside the chamber and the ambient conditions outside the chamber). FIG. 17 illustrates an alternative system 830 having multiple chambers to provide four temperatures zones. As shown in FIG. 17, system 830 may operate in a similar manner to system 430 (shown in FIGS. 10-14), where the reference numbers for the respective features are increased by "800" from those of system 30 (shown in FIGS. 2-5), by "600" from those of system 230 (shown in FIGS. 6-9), by "400" from those of system 430, and by "200" from those of system 630.

System 830 includes chambers 834a, 834b, and 834c, respectively having chamber walls 848a, 848b, and 848c, heating mechanisms 856a, 856b, and 856c, and ports 858a, 858b, and 858c. The multiple-chamber arrangement provides multiple temperature gradients at ports 858a, 858b, and 858c. For example, heating mechanism 856a may maintain chamber 834a at a first temperature(s), heating mechanism 856b may maintain chamber 834b at a second temperature(s) lower than the first temperature(s), and heating mechanism 856c may maintain chamber 834c at a third temperature(s) lower than the second temperature(s) and higher than the ambient conditions (e.g., room temperature).

This embodiment is particularly suitable for use with materials that are temperature and oxygen sensitive, such as polyamide materials (e.g., nylon-based materials), which can oxidize when exposed to elevated temperatures in a heated environment, potentially rendering them brittle. As discussed above for the single-chamber systems 30, 230, 430, and 630, the drive mechanisms desirably index the print foundations at rates that are slow enough such that the printed layers reside in the chamber for a duration that is sufficient to substantially relieve cooling stresses, prior to reaching the port to ambient conditions. This allows the printed layers to be relaxed enough such that when they reach the temperature gradient at the port, the temperature drop at the temperature gradient does not cause any substantial distortions or curling. However, this can cause temperature/oxygen-sensitive materials to oxidize prior to reaching the port.

Instead, as shown in FIG. 17, the use of multiple chambers allows the printed layers to exit chamber 834a into chamber 834b via port 858a prior to fully relieving their cooling stresses. The second temperature(s) of chamber 834b are desirably high enough to allow the layers to gradually relax without distorting or curling, while also low enough to reduce the rate of oxidation for the part material (or prevent oxidation entirely). This process may continue into chamber 834c (via port 858b) as well to continue to gradually relax the printed layers prior reaching port 858c.

The particular temperatures maintained in chambers 834a, 834b, and 834c may vary depending on the particular part and support materials used. Furthermore, the number of chambers (chambers 834a, 834b, and 834c may vary). Suitable numbers of chamber range from one to five. Additionally, the dimensions of each chamber may be the same or different to accommodate the cooling of different part and support materials. In some embodiments, the dimensions of each chamber may be changeably, such as with accordion-style walls 848a, 848b, and 848c to further accommodate the cooling of different part and support materials. As can be appreciated, the use of multiple, successive chambers maintained at step-down temperatures increases the number of materials that may be printed with the additive manufacturing systems of the present disclosure.

Scaffolds

As discussed above, the scaffolds of the present disclosure (e.g., scaffolds 54, 254, 454, and 654) may provide multiple functions during printing operations with additive manufacturing systems. For example, the scaffolds may laterally brace the printed 3D parts during horizontal printing operations to prevent the 3D parts from sagging due to gravity. Alternatively, the scaffolds may laterally brace the printed 3D parts during vertical printing operations to prevent the 3D parts from wobbling. Furthermore, during both horizontal and vertical printing operations, the scaffolds may include conveyor bases that are indexable by drive mechanisms of the additive manufacturing systems, thereby allowing the 3D parts and scaffolds to be indexed outside of the systems, without requiring long gantries. Additionally, as discussed below, the scaffolds may function as print foundation receiving surfaces for printing multiple, successive 3D parts.

Figure 18A:
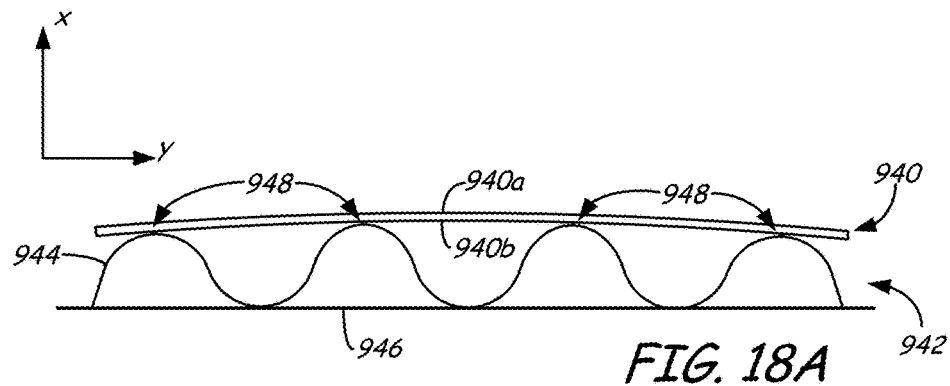
FIG. 18A is a front view of a horizontally-printed, thin-walled 3D part with a scaffold.
Figure 18B:
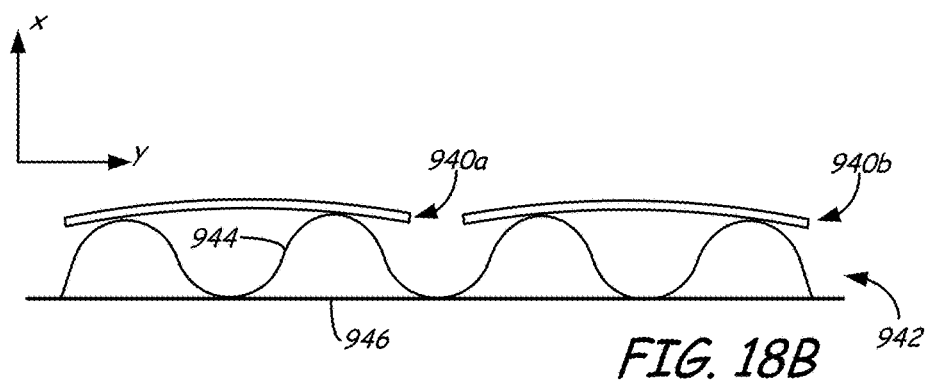
FIG. 18B is a front view of a multiple, horizontally-printed, thin-walled 3D parts with a scaffold, where the multiple 3D parts are printed laterally adjacent to each other.
Figure 18C:
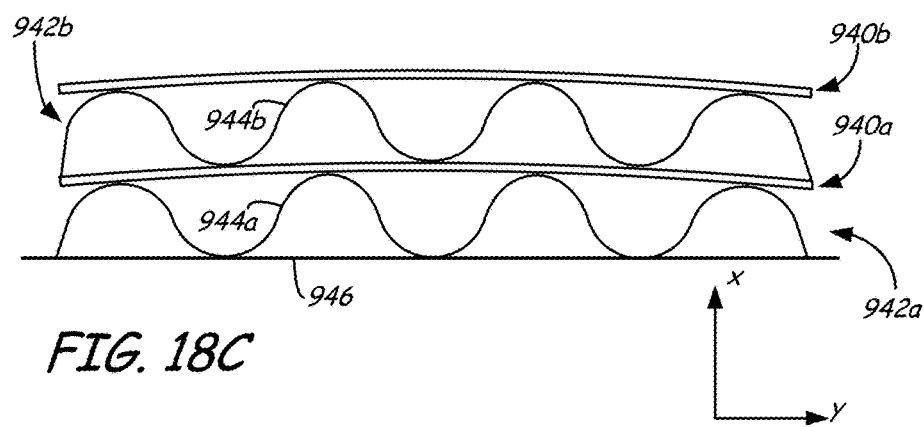
FIG. 18C is a front view of a multiple, horizontally-printed, thin-walled 3D parts with multiple scaffolds, where the multiple 3D parts are printed adjacent to each other in a stacked arrangement.
Figure 19:
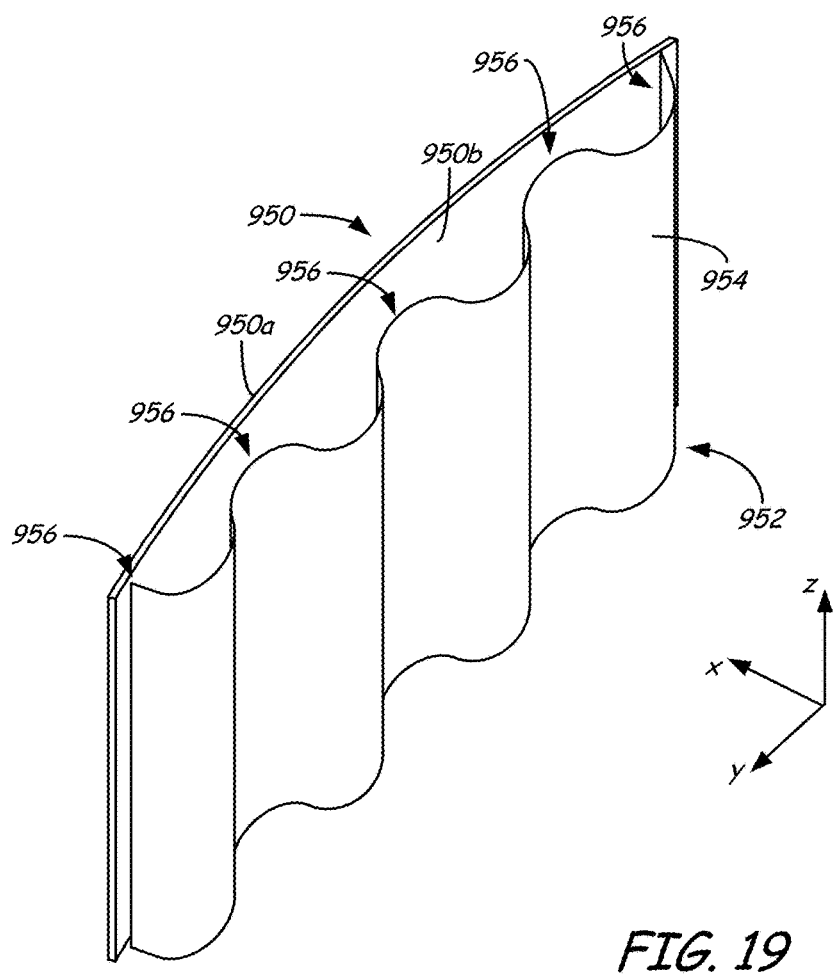
FIG. 19 is a rear perspective view of a vertically-printed, thin-walled 3D part with a scaffold.

FIGS. 18A-18C and 19 illustrate example scaffolds that may be printed with additive manufacturing systems. However, the scaffolds of the present disclosure are not limited to these particular embodiments and may alternatively include a variety of different geometries depending on their particular purposes. Nonetheless, the embodied scaffolds shown in FIGS. 18 and 19 are particularly suitable for use when printing 3D parts that are long or tall along their printing axes relative to their cross-sectional dimensions.

In the examples shown in FIGS. 18A-18C and 19, the scaffolds are printed with thin-walled 3D parts (e.g., thin-walled panels). In some embodiments, each layer of a thin-walled 3D part, support structure, and/or scaffold may be printed with narrow perimeter roads and a wider interior road with the use of a print head nozzle as disclosed in co-filed U.S. patent application Ser. No. 13/587,002, entitled "Print Head Nozzle For Use With Additive Manufacturing System". Additionally, the 3D parts, support structures, and scaffolds disclosed herein may be printed with draw control techniques as disclosed in co-filed U.S. patent application Ser. No. 13/587,009, entitled "Draw Control For Additive Manufacturing Systems".

For example, FIG. 18A illustrates thin-walled 3D part 940 printed horizontally with scaffold 942, which may be performed in the same manner as discussed above for scaffolds 54, 254, and 454. In this example, 3D part 940 includes major exterior surfaces 940a and 940b, and scaffold 942 includes ribbon portion 944 and conveyor base 946. Ribbon portion 944 braces exterior surface 940b of 3D part 940 against gravity with contact points 948.

Contact points 948 are located intermittently along the z-axis (not shown) at each wave peak of ribbon portion 944, and each may be a single drop of part or support material that connects exterior surface 940b to ribbon portion 944. In particular, contact points 948 may be at tangential locations of the wave pattern of ribbon portion 944. The collection of contact points 948 allow ribbon portion 944 to laterally brace 3D part 940 against gravity (i.e., to prevent sagging), while also allowing ribbon portion 944 to be readily removed from 3D part 940 without undue effort.

In embodiments in which the droplets at contact points 948 are derived from the part material, the droplets may function as break-away locations due to their relatively weak bonds. Alternatively, in embodiments in which the droplets at contact points 948 are derived from a soluble support material, the droplets may be dissolved away to separate ribbon portion 944 from 3D part 940. Conveyor base 946 is a planar sheet that supports ribbon portion 944, providing a smooth surface that can rest on and slide over guide rails and/or other surfaces, and may also assist in indexing scaffold 942 and 3D part 940, as discussed above.

Alternatively, as shown in FIG. 8B, a single scaffold 942 may laterally brace multiple adjacently-printed parts 940a and 940b. In this embodiment, 3D parts 940a and 940b may be printed laterally adjacent to each other along the y-axis, where ribbon portion 944 stabilizes each of them.

Additionally, as shown in FIG. 18C, multiple scaffolds 942a and 942b (having ribbon portions 944a and 944b) may be used to print multiple, stacked 3D parts 940a and 940b that are adjacent to each other along the x-axis. In this embodiment, ribbon portion 944b (or multiple ribbons 944b) may be disposed between the stacked 3D parts 940a and 940b to brace them against sagging while printing along the horizontal z-axis.

FIG. 19 illustrates thin-walled 3D part 950 printed vertically with scaffold 952, which may be performed in the same manner as discussed above for scaffold 654, or may be printed vertically in an additive manufacturing system having a large enclosed chamber, such as an additive manufacturing system commercially available from Stratasys, Inc., Eden Prairie, Minn. under the trademarks "FDM" and "FORTUS 900mc". In this example, 3D part 950 includes major exterior surfaces 950a and 950b, and scaffold 952 only includes ribbon portion 954 (no conveyor base), which braces exterior surface 950b of 3D part 940 against wobbling with contact points 956. Contact points 956 may function in the same manner as contact points 948 for bracing 3D part 950 during the printing operation, while also allowing scaffold 952 to be readily removed from 3D part 950 after the printing operation is completed. For example, contact points 956 may be at tangential locations of the wave pattern of ribbon portion 954.

However, as discussed above, in the vertical printing orientation, scaffold 952 functions as a lateral brace to reduce or prevent 3D part 250 from wobbling during the printing operation. For example, when 3D part 950 and scaffold 952 are printed with system 630 (shown in FIGS. 15 and 16), scaffold 952 may laterally brace 3D part 950 as platen 636 indexes downward out of chamber 634. Alternatively, when printing in a large enclosed chamber, such as in an additive manufacturing system commercially available from Stratasys, Inc., Eden Prairie, Minn. under the trademarks "FDM" and "FORTUS 900mc", scaffold 952 may laterally brace 3D part 950 as the platen indexes downward within the large enclosed chamber. In each of these situations, scaffold 950 may reduce or prevent 3D part 950 from wobbling, thereby substantially maintaining proper registration between 3D part 950 and the print head.

This is particularly suitable for a 3D part having an aspect ratio of the height along the printing z-axis relative to its smallest cross-sectional area in the x-y plane (or the plane perpendicular to the print axis) that is about 5:1 or greater. Thus, the scaffold (e.g., scaffold 950) desirably has a cross-sectional area in the x-y plane (or the plane perpendicular to the print axis) such that a combined cross-sectional area for each printed layer (of the 3D part and scaffold) is less than 5:1.

Furthermore, scaffolds 942 and 952 may be printed with single road widths per layer. For example, each layer of ribbon portion 944 and conveyor base 946 of scaffold 942 (shown in FIG. 17) may each be printed with a single road width, and each layer of ribbon portion 954 of scaffold 952 (shown in FIG. 18) may be printed with a single road width.

The wave patterns of ribbon portions 944 and 954 allow the print head to print each layer at a substantially constant tip speed or velocity without having to slow down at corner vertices at the crests and valleys of the waves. This, along with the single-road width, can substantially reduce printing times. Furthermore, the wave patterns of ribbon portions 944 and 954 allow a substantially constant draw to be maintained, as disclosed in co-filed U.S. patent application Ser. No. 13/587,009, entitled "Draw Control For Additive Manufacturing Systems", which provides good, smooth roads with reduced or no rippling or cresting.

Figure 20A:
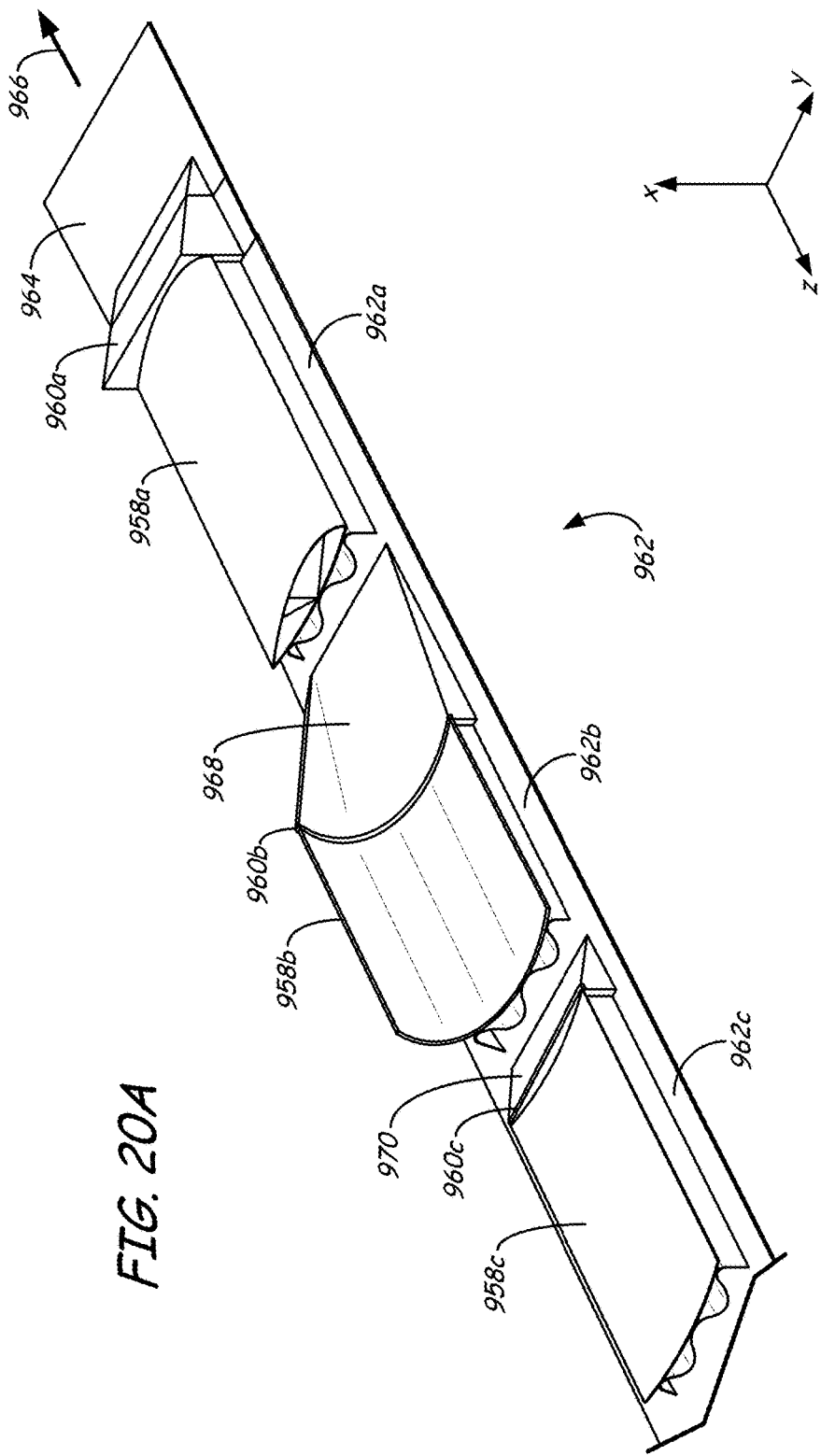

The scaffolds of the present disclosure are also suitable for printing multiple, successive 3D parts in a continuous manner, particularly when used in combination with the additive manufacturing systems and starter pieces of the present disclosure. FIG. 20A shows 3D parts 958a, 958b, and 958c respectively printed on support structures 960a, 960b, and 960c, with the use of scaffold assembly 962 (having scaffold segments 962a, 962b, and 962c), and starter piece 964, while being indexed in the direction of arrow 966. 3D part 958a, support structure 960a, and the ribbon-base portion of scaffold segment 962a may be printed on starter piece 964 in the same manner as discussed above for 3D part 450, support structure 452, scaffold 454, and starter piece 492 (shown in FIGS. 6-9).

However, if multiple 3D parts are in queue for successive printing, the system (e.g., system 430) may continue to print scaffold segment 962a to generate wedge portion 968 having an increasing cross-sectional area (in the same manner as discussed above for support structure 452). As such, the layers of wedge portion 968 of scaffold segment 962a may be printed with increasing cross-sectional areas until they at least encompass the footprint area of 3D part 958b and scaffold segment 962b. Thus, the last layer of wedge portion 968 functions as a print foundation receiving surface for support structure 960b. At this point, support structure 960b, 3D part 958b, and scaffold segment 962b may be printed, where support structure 960b is disposed between scaffold segment 962a and 3D part 958b. Printing support structure 960b between wedge portion 968 and 3D part 958b allows 3D part 958b to be subsequently separated from scaffold 962b (e.g., by dissolving support structure 960b), and may reduce curling effects on 3D part 958b.

The same technique may then be repeated to print wedge portion 970 of scaffold segment 962b, and then to print support structure 960c, 3D part 958c, and scaffold segment 962b. With the systems of the present disclosure having ported heated chambers, this process may continue as long as desired to continuously print successive 3D parts. Each scaffold wedge portion (e.g., wedge portions 968 and 970) may have different dimensions corresponding to the footprint areas of their respective 3D parts, where each wedge portion defines a planar receiving surface in the x-y plane for starting the subsequent printing. Thus, each printed 3D part may have different dimensions and geometries.

In the shown example, wedge portion 968 and 970 are printed as components of scaffold segments 962a and 962b. In alternative embodiments, wedge portion 968 and 970 may be printed as components of support structures 960b and 960c in the same manner as support structure 960a. In these embodiments, the layers of support structures 960b and 960c may be printed with increasing cross-sectional areas, as discussed above for support structure 452 (as best shown above in FIG. 12).

Furthermore, as shown in FIG. 20B, support structure 960b may cover the entire footprint area of 3D part 958b and scaffold segment 962b, providing an edge segment for support structure 960b. Similarly, support structure 960c may cover the entire footprint area of 3D part 958c and scaffold segment 962c, providing an edge segment for support structure 960c. In this embodiment, scaffold segments 962a, 962b, and 962c may be entirely separate scaffolds that are separated by support structures 960b and 960c.

3D parts may be printed with this continuous technique by providing tool path and related print instructions to the additive manufacturing system for each 3D part, support structure, and scaffold. In one embodiment, a host computer (e.g., host computer 484) may receive digital representations of each 3D part to be printed successively. The host computer may initially slice each digital 3D part and render the associated tool paths. The host computer can also generate tool paths for the support structures and scaffolds, where the support structures and/or scaffolds have the wedge portions to receive the successive 3D parts.

For example, the host computer may initially determine or otherwise identify the cross-sectional area of the print foundation receiving surface (e.g., the receiving surface for starter piece 964) and the combined footprint area of 3D part 958*a* and scaffold 962*a*. The host computer may then generate tool paths for the layers of support structure 960*a*, where the layers have increasing cross-sectional areas, starting at the location of the print foundation receiving surface, until they encompass the combined footprint area of 3D part 658*a* and scaffold 962*a*. The host computer may also slice the digital representation of the 3D part 958*a*, render the associated tool paths for each layer, and generate tool paths of the layers for scaffold 962*a*.

For 3D part 958*b*, the host computer may determine or otherwise identify the cross-sectional area of the last layer of scaffold 962*a* (prior to wedge portion 968) and the combined footprint area of 3D part 958*b* and scaffold 962*b*. The host computer may then generate tool paths for the layers of wedge portion 968, where the layers have increasing cross-sectional areas, starting at the location of the last layer of scaffold 962*a*, until they encompass the combined footprint area of 3D part 658*b* and scaffold 962*b*. The host computer may also slice the digital representation of the 3D part 958*b*, render the associated tool paths for each layer, generate tool paths of the layers for support structure 960*b*, and generate tool paths of the layers for scaffold 962*a*. As discussed above, the tool paths for the layers of wedge portion 968 may alternatively be generated as part of support structure 960*b*.

The same process may then be repeated for wedge portion 970, 3D part 958*c*, support structure 960*c*, and scaffold 962*c*; and for each subsequent 3D part thereafter. The host computer may then transmit the generated tool paths and related printing information to the additive manufacturing system to print the 3D parts, support structures, and scaffolds.

In an alternative embodiment, the host computer may receive digital representations of the 3D parts in a piecemeal manner. For example, the host computer may receive, slice, and generate tool paths for 3D parts 958*a* and 958*b*, support structures 960*a* and 960*b*, and scaffold segments 962*a* and 962*b*. Since, in this example, there are no intended 3D parts to be printed after 3D part 958*b*, only the ribbon-base portion of scaffold segment 962*b* is needed (i.e., wedge portion 970 is not generated). The host computer may then transmit the generated tool paths and related printing information to the additive manufacturing system to print 3D parts 958*a* and 958*b*, support structures 960*a* and 960*b*, and scaffold segments 962*a* and 962*b* (without wedge portion 970).

If, while the additive manufacturing system is printing, the host computer then receives a digital representation of 3D part 958*c*, the host computer may then slice and generate tool paths for 3D part 958*c*, support structure 960*c*, wedge portion 970 of scaffold segment 962*b*, and scaffold segment 962*c*. The host computer may then transmit the generated tool paths and related printing information to the additive manufacturing system to add to the end of its previous printing instructions. This is attainable because the cross-sectional area of the last layer of scaffold segment 962*b* is known, allowing wedge portion 970 to be printed with an increasing cross-sectional area from the last layer of scaffold segment 962*b*.

This technique effectively allows the additive manufacturing system to continuously print multiple, successive 3D parts along a single scaffold assembly, where each printed 3D part exits the chamber of the system through its port (e.g., port 458). As can be appreciated, the use of a starter-piece print foundation and an associated drive mechanism, in combination with this technique, effectively allows an unlimited number of 3D parts to be printed along the z-axis. After exiting the system, if desired, each printed 3D part may be separated from the growing scaffold assembly at its support structure connection, and then removed from its associated scaffold, as discussed above.

EXAMPLES

The present disclosure is more particularly described in the following examples that are intended as illustrations only, since numerous modifications and variations within the scope of the present disclosure will be apparent to those skilled in the art.

Example 1

Horizontal printing operations were performed with an additive manufacturing system commercially available from Stratasys, Inc., Eden Prairie, Minn. under the trademarks "FDM" and "UPRINT", which was oriented such that the printing z-axis was horizontal. A port was cut into the base of the system, and a platen gantry was installed to the system such that the platen gantry extended out of the port for several feet. This system corresponded to system 30 (shown in FIGS. 2-5) having an extended platen gantry.

The system was operated to print multiple long 3D parts, including airfoils, manifolds, and thin-walled panels. During each printing operation, the chamber of the system was initially heated to an elevated operating temperature. This created a thermal gradient at the port between the elevated operating temperature within the chamber and the ambient air outside the chamber (about 25° C.).

The print head initially printed multiple layers of a support structure on a platen from a support material, which functioned as an adhesive base for the subsequent printing. The print head then printed layers of the 3D part with a scaffold corresponding to scaffold 54, both from the same part material. The scaffold had a ribbon portion and a conveyor base, where the ribbon portion was connected to the 3D part with connection point droplets of the part material (as discussed above for scaffold 942, shown in FIG. 18A).

After each layer was printed, the platen gantry indexed the platen by a single layer increment, which allowed the 3D part and scaffold to grow horizontally. As this continued, the platen, the support structure, the 3D part, and the scaffold eventually passed through the thermal gradient at the port to extend outside of the system. The base portion of the scaffold was properly supported by the guide rails of the platen gantry, allowing the scaffold to slide across the guide rails during each indexing step.

Figure 21:
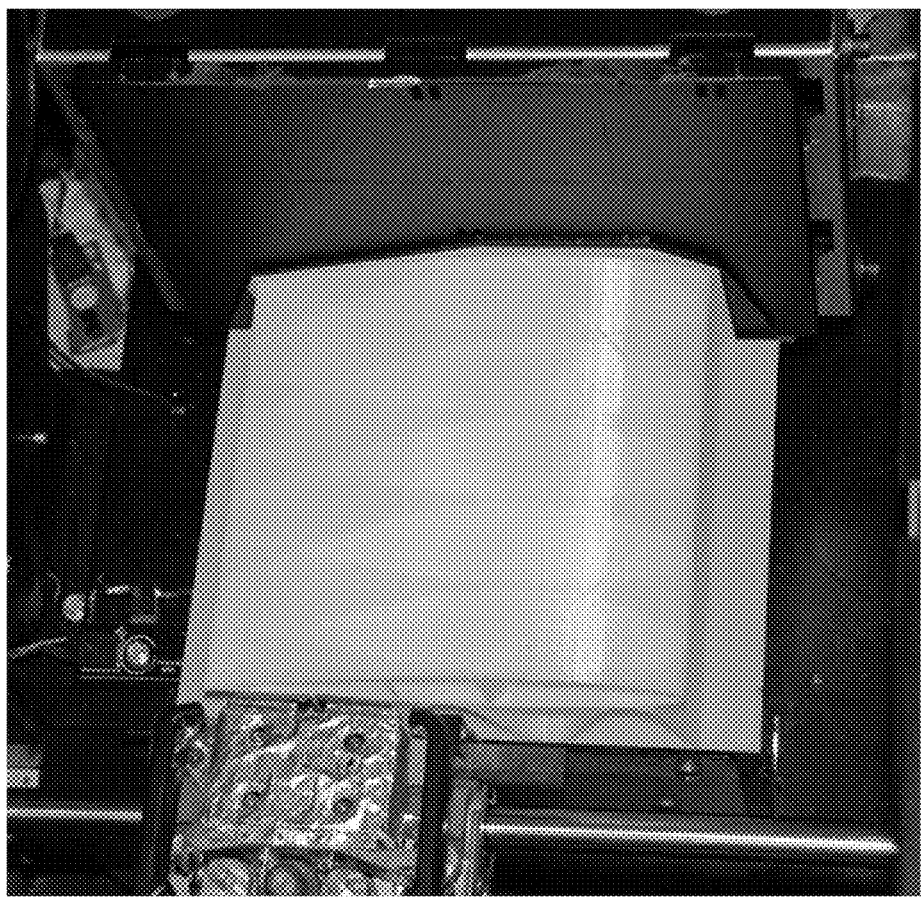
FIG. 21 is a top-view photograph of an example airfoil part printed horizontally with a support structure and scaffold.

When the printing operation was completed (after the 3D part and scaffold grew for several feet), the platen was removed from the platen gantry, and broken away from the support structure. The support structure was then removed, and the scaffold was readily broken off from the 3D part. FIG. 21 is a photograph illustrating one of the printed 3D parts and associated scaffold while still residing in the horizontally-oriented system. The top opening through which the photograph was taken was closed off during the printing operation, such that only a single port located behind the platen was open to the ambient environment. The photograph was taken prior to completion of the 3D part, showing only a small portion of the total length of the 3D part and scaffold.

Upon visual inspection, each 3D part printed in this manner exhibited good dimensional integrity due to the heated environment within the chamber, as well as use of the associated scaffold. The heated environment within the chamber allowed the 3D parts and scaffolds to cool down slowly to be sufficiently solidified by the time they reached the thermal gradient at the port to prevent distortions or curling. Additionally, without the use of the scaffolds, the long 3D parts would have otherwise sagged due to gravity during the printing operations. The scaffolds, however, stabilized the layers of the 3D parts, allowing the long 3D parts to be printed along the horizontal printing axis.

Example 2

Horizontal printing operations were also performed with the system of Example 1, where the platen and platen gantry were replaced with a wedge starter piece and associated drive mechanism. This system corresponded to system 430 (shown in FIGS. 10-14), and was operated to print multiple long 3D parts. During each printing operation, the chamber of the system was initially heated to an elevated operating temperature. This created a thermal gradient at the port between the elevated operating temperature within the chamber and the ambient air outside the chamber (about 25° C.).

The print head initially printed multiple layers of a support structure on a receiving surface of a wedge portion of the starter piece. As discussed above for the wedge starter piece 492, the layers of the support structure were printed with increasing cross-sectional area in the vertical x-y plane. In particular, each successive layer was printed to provide an angle of increasing size (corresponding to angle 526, shown in FIG. 12) of about 45 degrees from the printing axis. This was continued until the footprint cross-sectional area of the intended 3D part and scaffold was reached.

The print head then printed layers of the given 3D part with a scaffold corresponding to scaffold 454, both from the same part material. The scaffold had a ribbon portion and a conveyor base, where the ribbon portion was connected to the 3D part with connection point droplets of the part material (as discussed above for scaffold 942, shown in FIG. 18A).

After each layer was printed, the drive mechanism indexed the wedge starter piece by a single layer increment, which allowed the 3D part and scaffold to grow horizontally. As this continued, the wedge starter piece, the support structure, the 3D part, and the scaffold eventually passed through the thermal gradient at the port to extend outside of the system. By this point, the drive mechanism had passed the wedge starter piece and had engaged the edge segments of the conveyor base of the scaffold for the indexing steps.

When the printing operation was completed, the scaffold was removed from the drive mechanism. The wedge starter piece was then broken away from the support structure. The support structure was then dissolved away, and the scaffold was readily broken off from the 3D part. Upon visual inspection, each 3D part printed in this manner also exhibited good dimensional integrity due to the heated environment within the chamber, as well as use of the associated scaffold. Furthermore, the scaffold effectively functioned as an indexing conveyor for the drive mechanism, allowing the overall footprint of the system to be reduced from that of the system in Example 1, and also effectively allowed the 3D parts to be grown to unbound lengths.

Example 3

A vertical printing operation was performed to produce a scaled-down car hood with a scaffold (corresponding to 3D part 950 and scaffold 952, shown in FIG. 19) using an additive manufacturing system commercially available from Stratasys, Inc., Eden Prairie, Minn. under the trademarks "FDM" and "FORTUS 900mc". In this example, the system had a large enclosed chamber used to print the scaled-down car hood and the scaffold.

The hood and the scaffold were each printed from a polycarbonate material with a print head nozzle as disclosed in co-filed U.S. patent application Ser. No. 13/587,002, entitled "Print Head Nozzle For Use With Additive Manufacturing System". The scaffold was connected to the rear side of the hood with connection point droplets of the part material at tangential locations of the ribbon portion (as discussed above for scaffold 952). Each layer of the printed hood was printed with a 120-mil wall thickness, which included two 20-mil wide perimeter roads followed by an 80-mil wide internal fill road. Each layer of the scaffold was printed as a 40-mil single-road wall.

Figure 22:
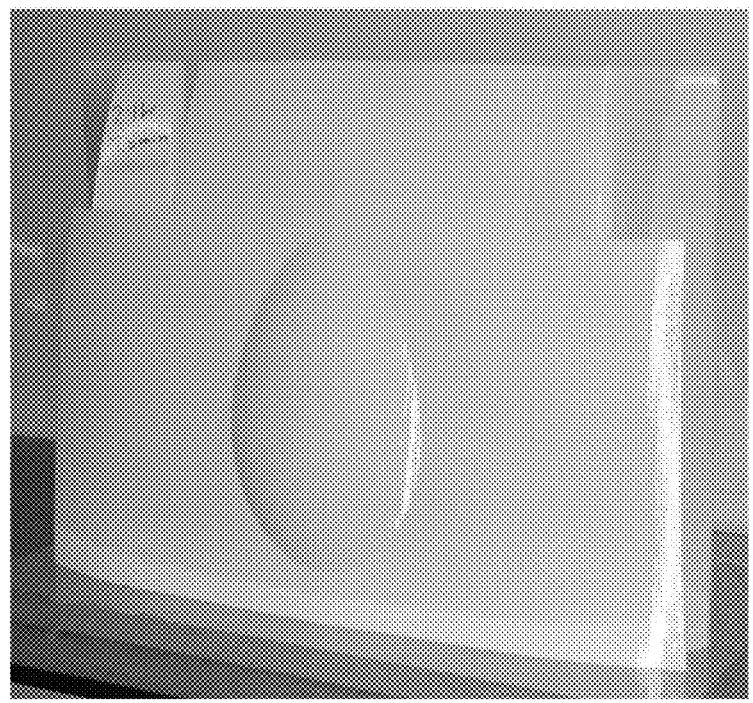
FIG. 22 is a front-view photograph of an example thin-walled panel printed vertically with a scaffold.
Figure 23:
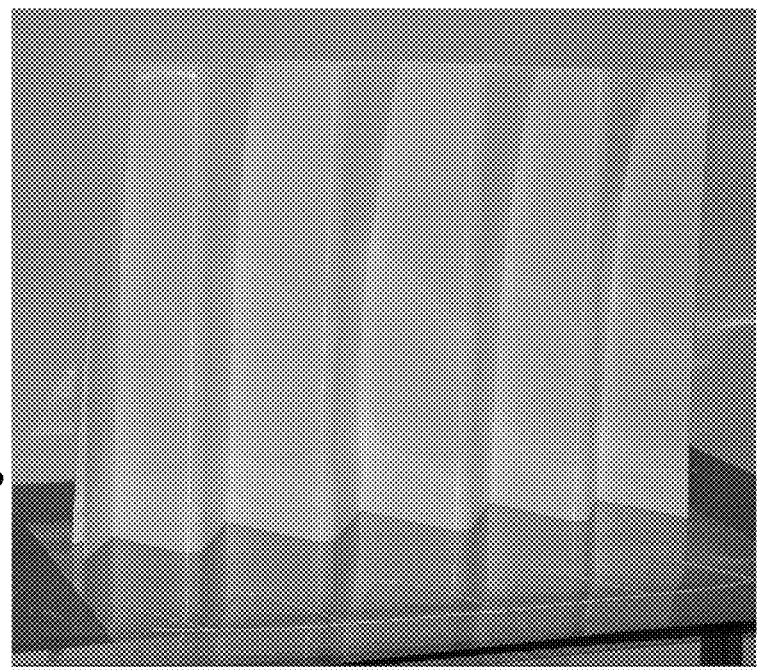
FIG. 23 is a rear-view photograph of the example thin-walled panel printed vertically with the scaffold.

The resulting hood and scaffold are shown in FIGS. 22 and 23, where the hood was 35 inches wide and 27 inches tall. Upon visual inspection, the resulting hood exhibited good dimensional integrity due to the use of the scaffold, which laterally supported the hood during the printing operation. This prevented the upper portion of the hood from wobbling during the printing operation, thereby maintaining proper registration between the print head and the layers of the hood.

Additionally, as described in co-filed U.S. patent application Ser. No. 13/587,002, entitled "Print Head Nozzle For Use With Additive Manufacturing System", the additive manufacturing system with the above-mentioned nozzle printed the entire hood and scaffold in 24 hours and 25 minutes. In comparison, a standard printing operation with a conventional nozzle suitable for printing 20-mil wide roads, requires about 76 hours to print the shown hood. As such, the printing time was reduced by more than a factor of three.

Although the present disclosure has been described with reference to preferred embodiments, workers skilled in the art will recognize that changes may be made in form and detail without departing from the spirit and scope of the disclosure.

The invention claimed is:

1. A method for printing three-dimensional parts in a layer by layer manner with an extrusion-based additive manufacturing system, the method comprising:
    providing a starter piece having a receiving surface that is substantially parallel to a build plane and where the receiving surface is substantially normal to a print axis;
    extruding a first layer of a three-dimensional part and/or a sacrificial structure onto the receiving surface by extruding material from a print head;
    moving the starter piece and a printed portion of the three-dimensional part and/or the sacrificial structure a distance along the print axis,
    extruding a successive layer of the three-dimensional part and/or the sacrificial structure onto the previously printed layer; and repeating the moving and extruding steps to print the three dimensional part to a dimension greater than a build environment of the additive manufacturing system.

2. The method of claim 1, wherein printing the sacrificial structure comprises extruding a water soluble material.

3. The method of claim 1, wherein printing the sacrificial structure comprises extruding a part material.

4. The method of claim 1, wherein the print axis is substantially horizontal.

5. The method of claim 1, wherein the print axis is substantially vertical.

6. The method of claim 1, wherein the print axis is at an angle between substantially horizontal and substantially vertical.

7. The method of claim 1, wherein the build environment comprises a chamber with a port wherein as the three-dimensional part is printed to a dimension greater than the build chamber, at least a portion of the part extends through the port.

8. The method of claim 7, and further comprising heating the chamber while the three-dimensional part is printed in a layer by layer manner.

9. The method of claim 1, and wherein printing the support structure comprises printing layers of a scaffold for the three-dimensional part, wherein the scaffold braces the three-dimensional part to address forces in the build plane as the three-dimensional part is printed.

10. The method of claim 8, wherein the scaffold is printed to have a configuration that causes spaced apart periodic contact with the three-dimensional part being printed.

11. The method of claim 1, and further comprising engaging the starter piece and subsequently printed layers of the part or the sacrificial structure with a drive mechanism of the additive manufacturing system to move the starter piece along the printing axis.

12. A method for printing three-dimensional parts in a layer by layer manner with an extrusion-based additive manufacturing system, the method comprising:
providing a starter piece having a receiving surface substantially parallel to a build plane and wherein the receiving surface is substantially normal to a print axis;
providing an electronic model of a three-dimensional part;
slicing the electronic model into a plurality of layers;
generating tool paths for each layer of the plurality of layers;
extruding each layer of the plurality of layers in the print plane with the extrusion-based additive manufacturing system based on the generated tool paths wherein the three-dimensional part is secured to the receiving surface of the starter piece such that the starter piece and a printed portion of the three-dimensional part move together along the print axis; and
repeating the extrusion and moving steps until the three-dimensional part is printed wherein a length of the three-dimensional part is greater than a length of a build environment of the additive manufacturing system.

13. The method of claim 12, and further comprising extruding a support structure along with the plurality of layers of the three-dimensional part, wherein printing the three-dimensional part onto the printed successive layers comprises extruding the three-dimensional part onto the support structure in a layer-by-layer manner.

14. The method of claim 12, and further comprising:
generating tool paths for each layer of the plurality of layers of the three dimensional part and scaffolds of the support structure; and
extruding the scaffold onto the extruded prior layer, wherein the scaffold braces the three-dimensional part against forces parallel to the build plane.

15. The method of claim 14, wherein the scaffold is extruded to have a configuration that causes spaced apart periodic contact with the three-dimensional part being printed.

16. The method of claim 12, wherein the print axis is substantially horizontal.

17. The method of claim 12, wherein the print axis is substantially vertical.

18. The method of claim 12, wherein the print axis is at an angle between substantially horizontal and substantially vertical.

19. The method of claim 12, wherein the build environment comprises a chamber with a port wherein as the three-dimensional part is printed to a dimension greater than the build chamber, at least a portion of the part extends through the port.

20. The method of claim 19, and further comprising heating the chamber while the three-dimensional part is printed in a layer by layer manner.

* * * * *